US009170686B2

(12) United States Patent
Scharff et al.

(10) Patent No.: US 9,170,686 B2
(45) Date of Patent: Oct. 27, 2015

(54) MULTI-TRANSDUCER WAVEGUIDE ARRAYS

(71) Applicant: Elo Touch Solutions, Inc., Menlo Park, CA (US)

(72) Inventors: Daniel H. Scharff, San Leandro, CA (US); Joel C. Kent, Fremont, CA (US)

(73) Assignee: Elo Touch Solutions, Inc., Milpitas, CA (US)

( * ) Notice: Subject to any disclaimer, the term of this patent is extended or adjusted under 35 U.S.C. 154(b) by 325 days.

(21) Appl. No.: 13/738,697

(22) Filed: Jan. 10, 2013

(65) Prior Publication Data

US 2014/0192026 A1   Jul. 10, 2014

(51) Int. Cl.
*G06F 3/043*   (2006.01)

(52) U.S. Cl.
CPC .................... *G06F 3/0436* (2013.01)

(58) Field of Classification Search
CPC ............... G06F 3/043; G06F 3/0436
USPC ......................................... 345/177
See application file for complete search history.

(56) References Cited

U.S. PATENT DOCUMENTS

| | | | | |
|---|---|---|---|---|
| 3,883,831 A * | 5/1975 | Williamson et al. | .......... | 333/153 |
| 3,978,437 A * | 8/1976 | Paige | .............. | 333/195 |
| 4,188,596 A * | 2/1980 | Miura | ............ | 333/151 |
| 4,210,883 A * | 7/1980 | Shah et al. | .......... | 333/195 |
| 4,700,176 A * | 10/1987 | Adler | .............. | 341/20 |
| 4,737,743 A * | 4/1988 | Solie | .............. | 333/153 |
| 4,746,830 A * | 5/1988 | Holland | ............. | 310/313 D |
| 4,801,836 A * | 1/1989 | Mariani | .................... | 310/313 D |
| 5,591,945 A * | 1/1997 | Kent | ........................... | 178/18.04 |
| 5,831,492 A * | 11/1998 | Solie | ............................ | 333/193 |
| 5,838,088 A * | 11/1998 | Toda | ........................ | 310/313 R |
| 5,854,450 A | 12/1998 | Kent | | |
| 5,883,457 A * | 3/1999 | Rinde et al. | ............... | 310/313 D |
| 5,886,452 A * | 3/1999 | Toda | ........................ | 310/313 R |
| 5,994,817 A * | 11/1999 | Toda | ........................ | 310/313 R |
| 6,023,122 A * | 2/2000 | Liu et al. | ................... | 310/313 B |
| 6,194,809 B1 * | 2/2001 | Takeuchi et al. | .......... | 310/313 R |
| 6,256,023 B1 * | 7/2001 | Yano et al. | .................... | 345/177 |
| 6,392,167 B1 * | 5/2002 | Nakagawa | ................ | 178/18.04 |
| 6,541,893 B2 * | 4/2003 | Zhu et al. | .................... | 310/313 B |
| 6,567,077 B2 * | 5/2003 | Inoue et al. | .................... | 345/173 |
| 6,577,041 B1 * | 6/2003 | Martin | ...................... | 310/313 B |
| 6,636,201 B1 * | 10/2003 | Gomes et al. | ................ | 345/173 |
| 6,791,236 B1 * | 9/2004 | Abramov | .................. | 310/313 B |
| 7,075,525 B2 * | 7/2006 | Cheng et al. | .................. | 345/177 |
| 7,274,358 B2 * | 9/2007 | Kent | ............................ | 345/177 |
| 7,462,973 B2 * | 12/2008 | Wachi et al. | ............... | 310/313 B |
| 7,764,276 B2 * | 7/2010 | Schermerhorn | .............. | 345/177 |

(Continued)

*Primary Examiner* — Christopher E Leiby
(74) *Attorney, Agent, or Firm* — Alston & Bird LLP

(57) ABSTRACT

Systems and related methods providing for touch sensors having segmented reflective arrays including waveguide cores are discussed herein. A touch sensor may include a substrate configured to propagate surface acoustic waves. The substrate may include two or more segmented reflective arrays. A segmented reflective array may include a major reflective array configured to propagate surface acoustic waves and a waveguide core configured to concentrate acoustic energy of the surface acoustic waves. Two segmented reflective arrays may further include adjacent portions that define an overlap region of the substrate. In some embodiments, the segmented reflective array may further include a beam dump configured to decrease intensity of surface acoustic wave propagation past the end of the segmented reflective array.

18 Claims, 25 Drawing Sheets

(56) References Cited

U.S. PATENT DOCUMENTS

| | | | |
|---|---|---|---|
| 8,325,159 B2* | 12/2012 | Kent et al. | 345/177 |
| 2002/0101408 A1* | 8/2002 | Sano et al. | 345/173 |
| 2002/0104691 A1* | 8/2002 | Kent et al. | 178/18.04 |
| 2002/0171635 A1* | 11/2002 | Takahashi et al. | 345/177 |
| 2003/0019669 A1* | 1/2003 | Toda | 178/18.04 |
| 2003/0234773 A1* | 12/2003 | Sano et al. | 345/177 |
| 2005/0073505 A1* | 4/2005 | Katsuki et al. | 345/173 |
| 2005/0243071 A1* | 11/2005 | Kent et al. | 345/177 |
| 2005/0248547 A1 | 11/2005 | Kent et al. | |
| 2011/0234545 A1* | 9/2011 | Tanaka et al. | 345/177 |
| 2013/0147768 A1* | 6/2013 | Aroyan et al. | 345/177 |

* cited by examiner

MULTI-TRANSDUCER WAVEGUIDE ARRAYS

FIELD

Embodiments discussed herein are related to, in general, touch sensors using surface acoustic waves to detect a touch event.

BACKGROUND

Touch sensor systems, such as those often used with displays, may act as input devices for interactive computer systems. Such systems may also be used for applications such as interactive digital signage, information kiosks, computers, order entry systems for restaurants, mobile devices, etc. By integrating a touch sensor system into a computing device, the computer may provide a user an intuitive, interactive human-machine-interface.

Currently, a variety of touch sensor technologies are implemented in different types of machines. These touch technologies are built on resistive, capacitive, and acoustic properties of various components. Acoustic touch sensors, such as ultrasonic touch sensors using surface acoustic waves, are particularly advantageous when the application demands a very durable touch sensitive surface and minimal optical degradation of the displayed image.

However, the size of acoustic touch sensors may be limited by the physics and other scientific principles that are leveraged to provide touch functionality. Through applied effort, ingenuity, and innovation, solutions to this and other problems have been developed that are included in embodiments of the present invention, some examples of which are described herein.

BRIEF SUMMARY

Systems and related methods are provided related to, in general, large touch sensors (e.g., touch sensors having a touch sensitive region with a diagonal length of 32 inches or greater). For example, some embodiments may include an acoustic touch apparatus comprising a substrate configured to propagate surface acoustic waves. The substrate may have a front surface and a back surface. A reflective array, as well as one or more transducers configured to generate a surface acoustic wave, may be positioned on the front and/or back surface(s). The reflective array may be configured to redirect at least a portion of the surface acoustic waves propagating within the substrate.

Some embodiments may provide for an acoustic touch apparatus that includes a substrate configured to propagate surface acoustic waves. The substrate may include a first segmented reflective array and a second segmented reflective array. The first segmented reflective array may include: a first major reflective array configured to propagate a first portion of surface acoustic waves in a first direction defining a first beginning and a first end of the first major reflective array; and a first waveguide core configured to concentrate acoustic energy of the first portion of surface acoustic waves. The second segmented reflective array may include: a second major reflective array configured to propagate a second portion of surface acoustic waves in a second direction defining a second beginning and a second end of the second major reflective array; and a second waveguide core configured to concentrate acoustic energy of the second portion of surface acoustic waves. In some embodiments, the first direction may be antiparallel to the second direction.

In some embodiments, the first end of the first major reflective array may extend beyond the second end of the second major reflective array, thereby defining a first adjacent portion of the first major reflective array. The second end of the second major reflective array may extend beyond the first end of the first major reflective array, thereby defining a second adjacent portion of the second major reflective array. The first adjacent portion and the second adjacent portion may define an overlap region of the substrate.

In some embodiments, the first adjacent portion may include the first waveguide core. Additionally and/or alternatively, the second adjacent portion may include the second waveguide core.

In some embodiments, a beam dump may be disposed at the first end of the first major reflective array. The beam dump may be configured to decrease intensity of surface acoustic wave propagation in the first direction past the first end of the first major reflective array. For example, the beam dump may be a solid waveguide core deflector configured to redirect surface acoustic waves away from a transducer. The beam dump may be a reflector grating configured to dampen surface acoustic waves propagating in the first direction. The beam dump may also be an acoustically absorptive layer.

In some embodiments, the first waveguide core may be defined at least partially by a solid core waveguide in the first adjacent portion. The first waveguide core may also be defined at least partially by waveguide reflector elements.

In some embodiments, the first major reflective array may include reflector elements disposed from the first beginning to the first end of the first major reflective array with distances separating pairs of the reflector elements. The distances varying between the first beginning and the first end of the first major reflective array. Furthermore, at least one of the waveguide reflector elements may be disposed between two of the reflector elements.

In some embodiments, the first major reflective array may define a first non-adjacent portion of the first major reflective array having a major width dimension; the first adjacent portion may define an adjacent width dimension smaller than the major width dimension; and the first major reflective array may define a first transition portion between the first non-adjacent portion and the first adjacent portion having a transition width dimension that tapers from the major width dimension to the adjacent width dimension in the first direction along the first major reflective array. In some embodiments, the first waveguide core may include a solid core waveguide in the first transition portion and the first adjacent portion.

In some embodiments, the solid core waveguide may define a first waveguide width dimension in the first adjacent portion and a second waveguide width dimension in the first transition portion; and the first waveguide width dimension may be larger than the second waveguide width dimension. The second waveguide width dimension may increase in the first direction within the first transition portion.

In some embodiments, the solid core waveguide may define a waveguide centerline; and the solid core waveguide is positioned relative to the first major reflective array such that the waveguide centerline is within a center third of the transition width dimension.

In some embodiments, the first major reflective array may include reflector elements each having a reflector angle; and a reflector angle of a first reflector element in the first transition portion may be different from a reflector angle of a second reflector element in the first adjacent portion.

In some embodiments, the second major reflective array may define a second non-adjacent portion of the second major reflective array having the major width dimension; the second adjacent portion may define the adjacent width dimension; and the second major reflective array may define a second transition portion between the second non-adjacent portion and the second adjacent portion having a second transition width dimension that tapers from the major width dimension to the adjacent width dimension in the second direction along the second major reflective array. In some embodiments, the first adjacent portion and the second adjacent portion may collectively define a collective adjacent width dimension that is the same as or smaller than the major width dimension.

Some embodiments may provide for an acoustic touch apparatus including a substrate configured to propagate surface acoustic waves. The substrate may include at least eight acoustic wave transducers and at least eight segmented reflective arrays. Each segmented reflective array may include: a major reflective array configured to propagate surface acoustic waves; and a waveguide core configured to concentrate acoustic energy of the surface acoustic waves.

In some embodiments, an acoustic touch apparatus may include a substrate with at least six acoustic wave transducers and at least six reflective arrays. At least four of the at least six reflective arrays may be segmented reflective arrays that each includes: a major reflective array configured to propagate surface acoustic waves; and a waveguide core configured to concentrate acoustic energy of the surface acoustic waves.

These characteristics as well as additional features, functions, and details of the present invention are described below. Similarly, corresponding and additional embodiments are also described below.

BRIEF DESCRIPTION OF THE DRAWINGS

Figure 1:
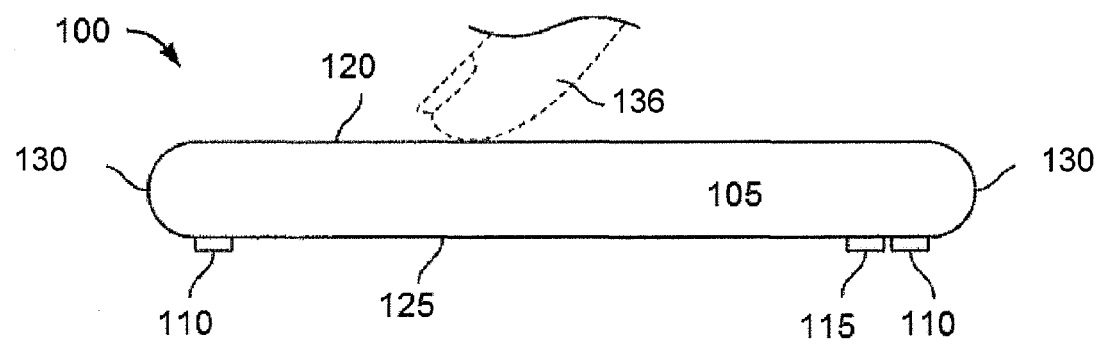
Figure 2A:
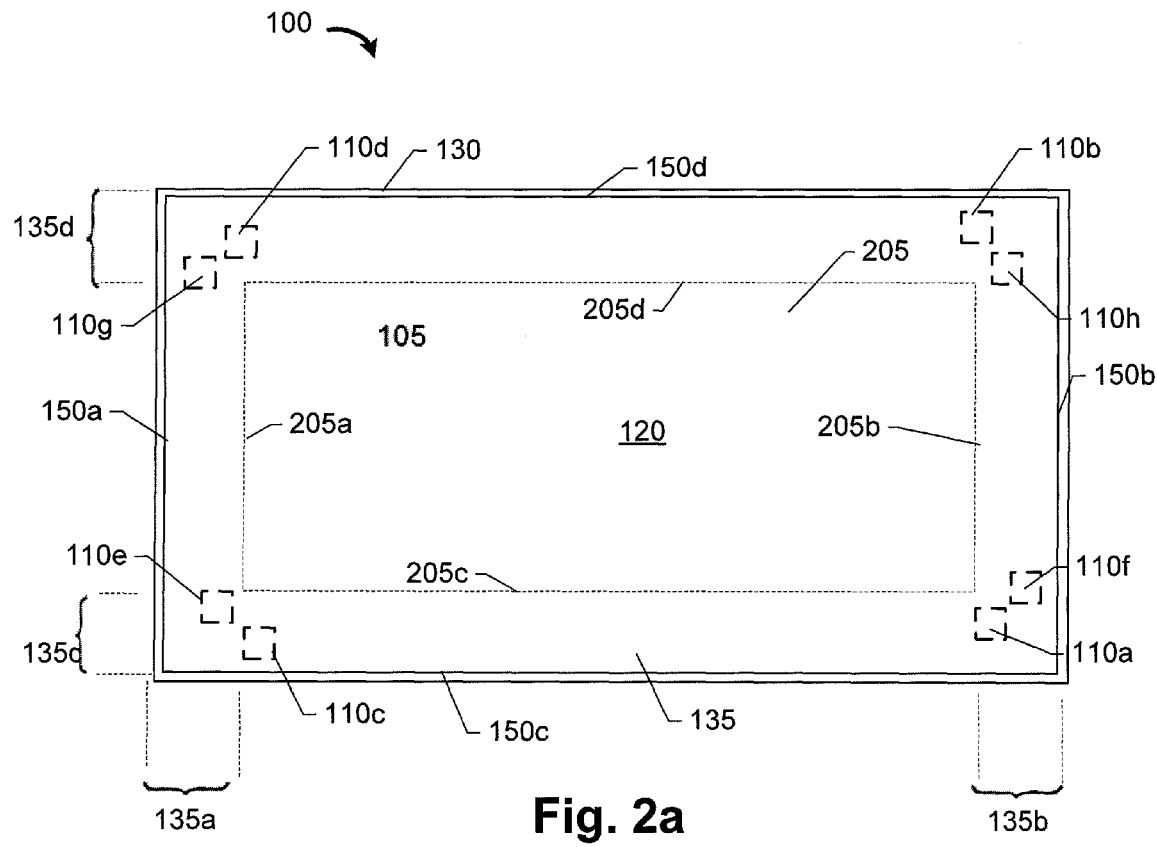
Figure 2B:
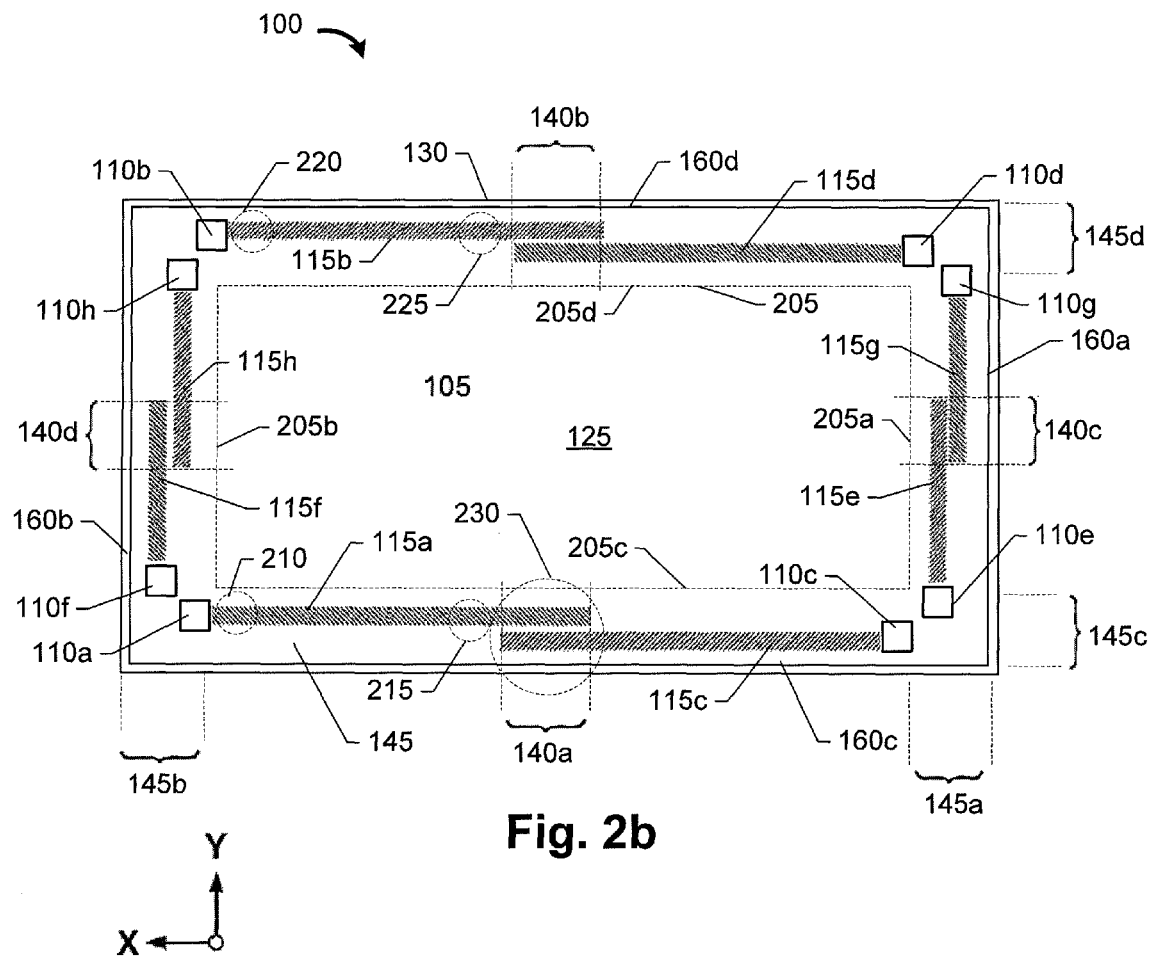
Figure 3A:
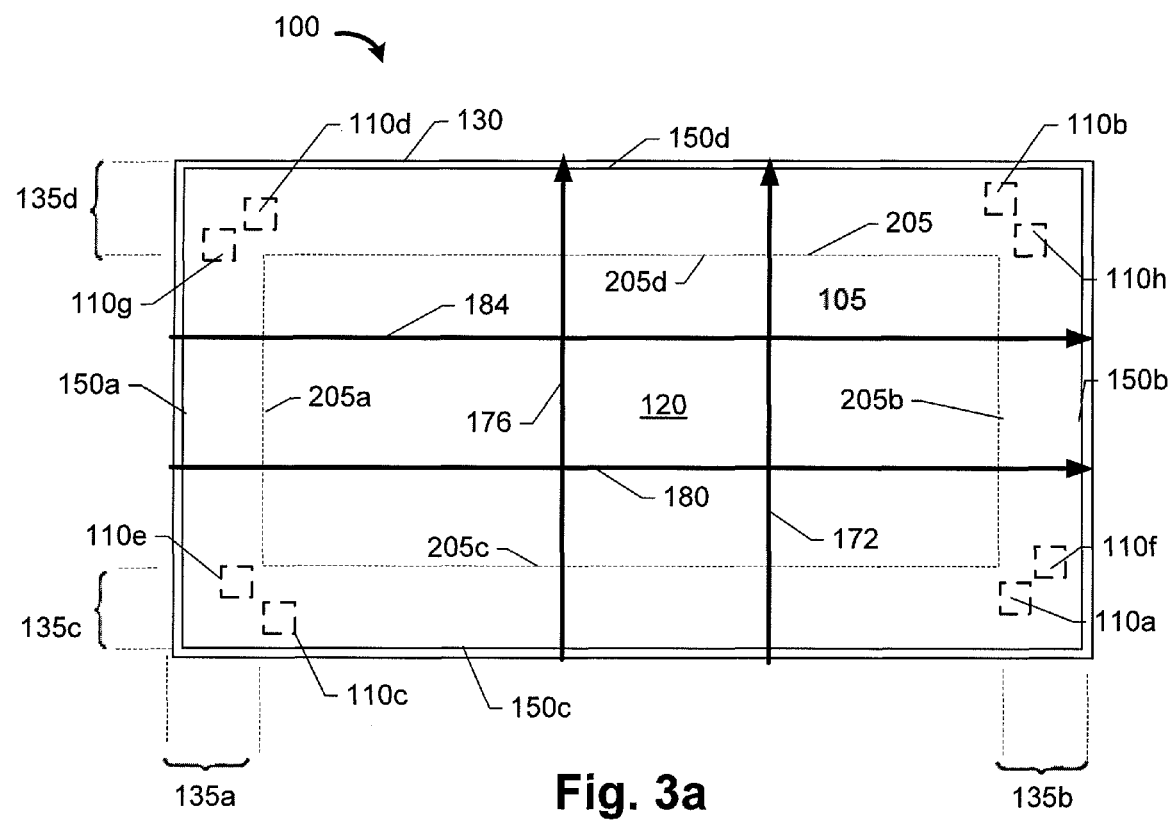
Figure 3B:
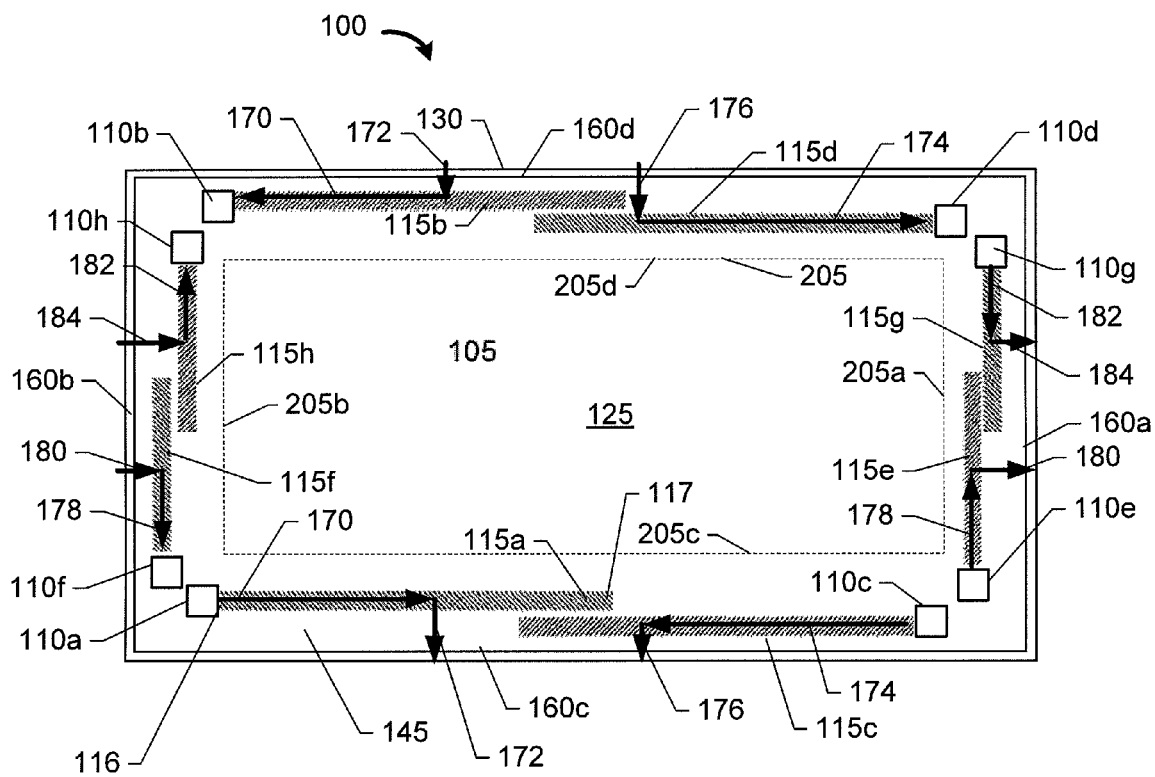
Figure 3B:
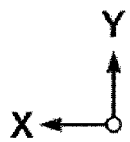
Figure 3C:
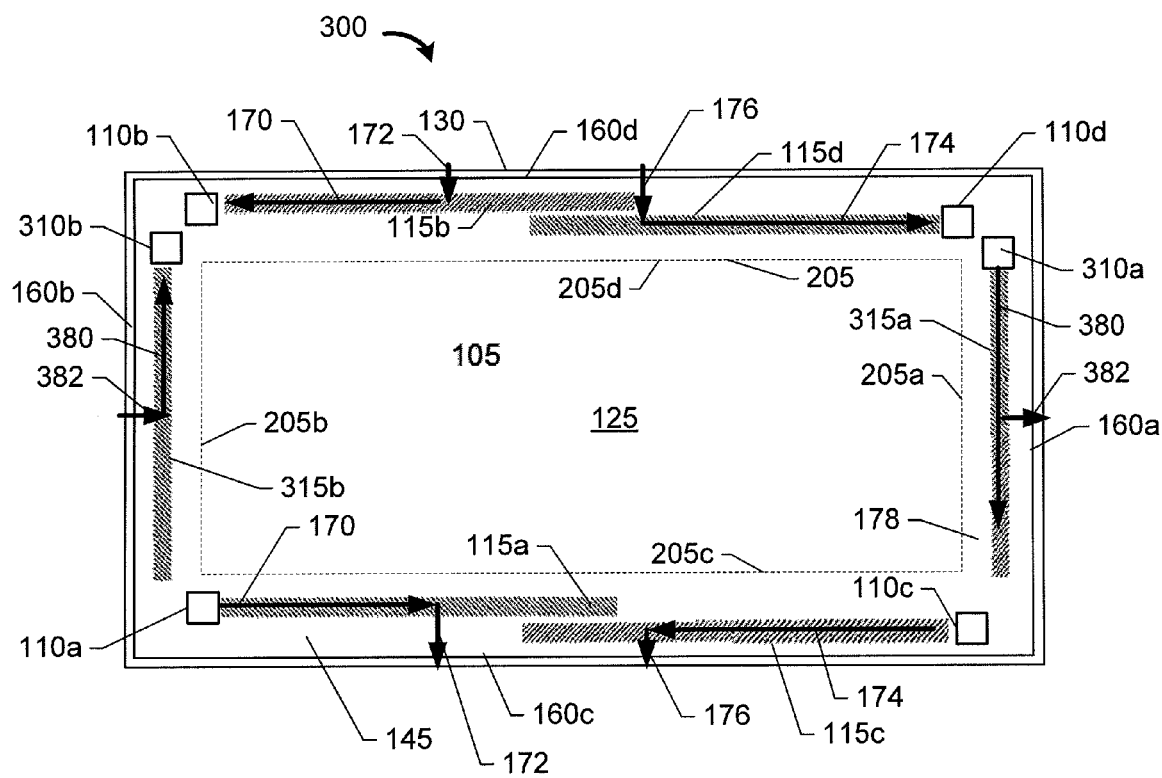
Figure 4A:
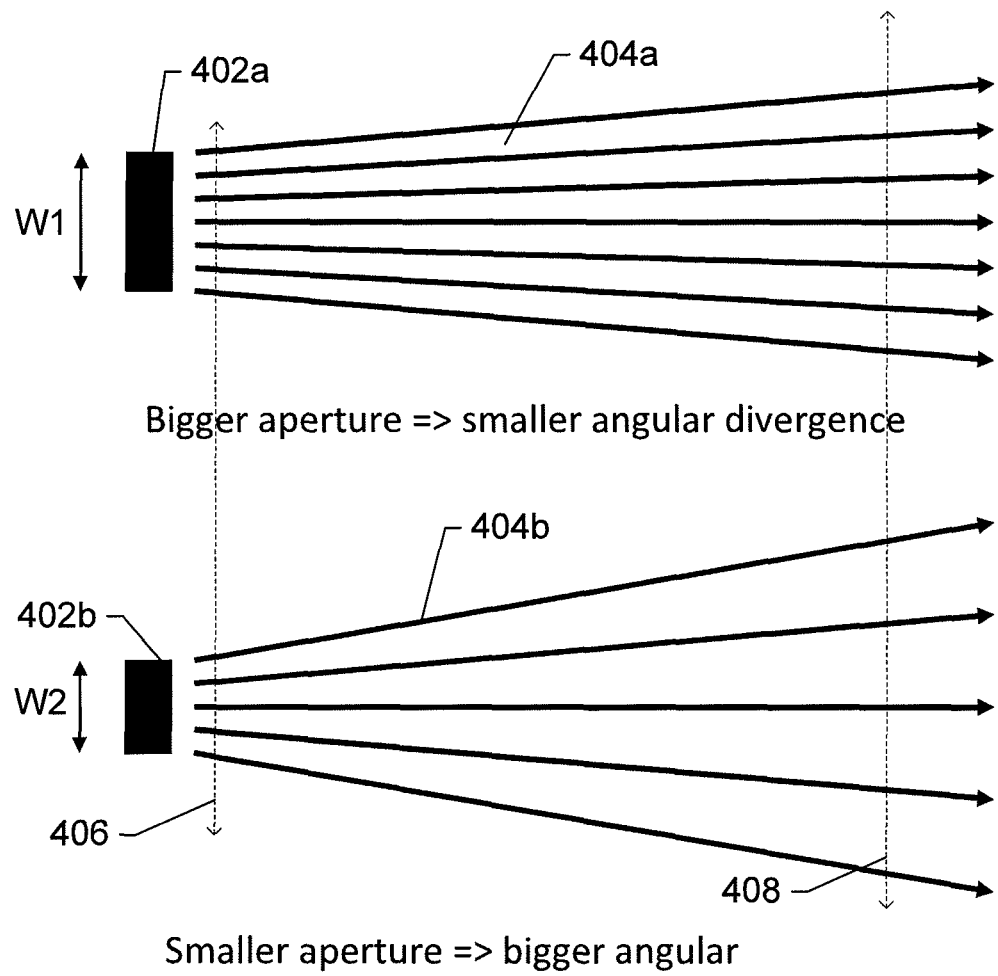
Figure 4B:
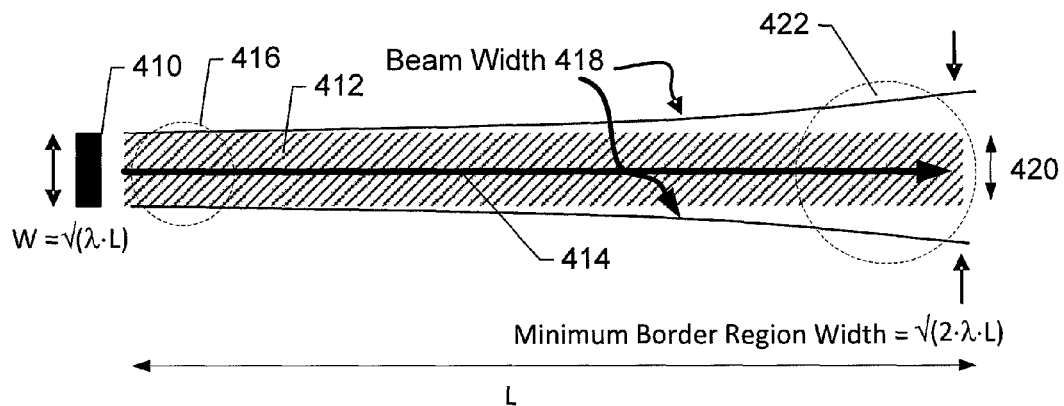
Figure 4C:
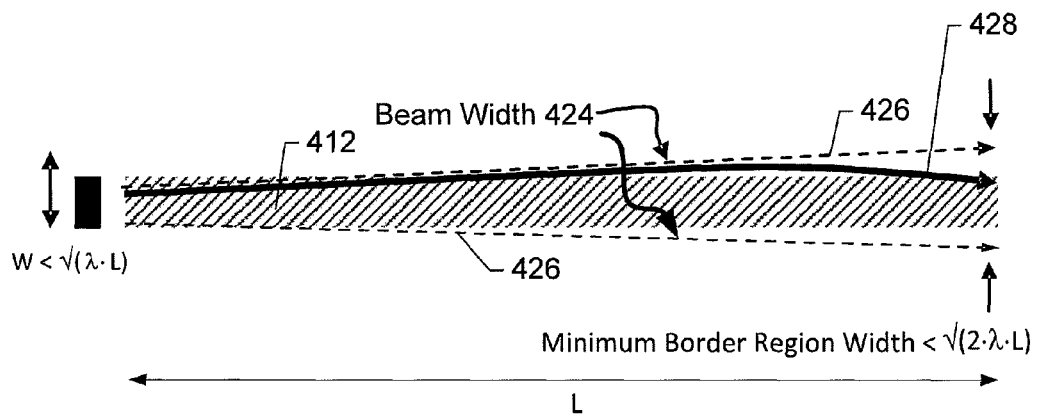
Figure 6A:
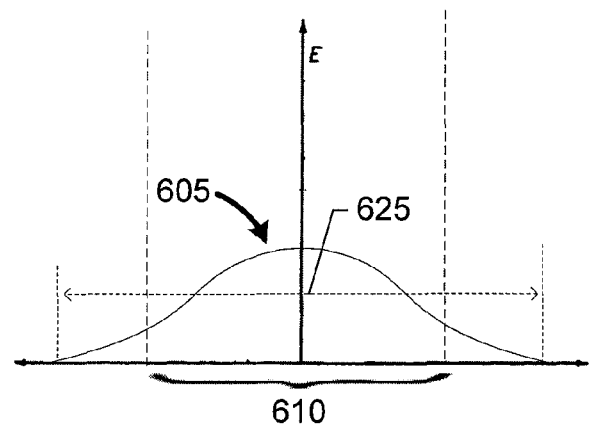
Figure 6B:
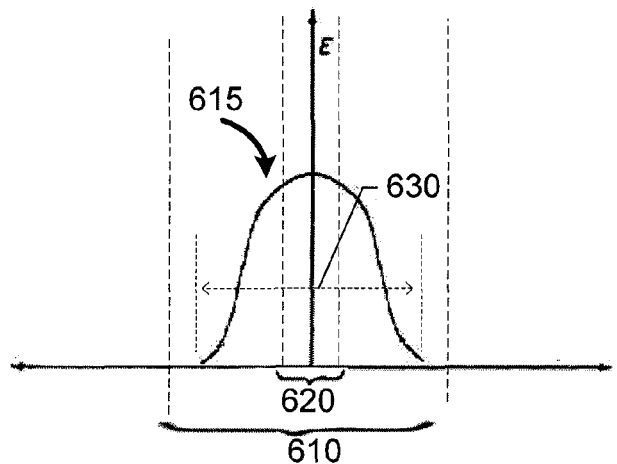
Figure 6C:
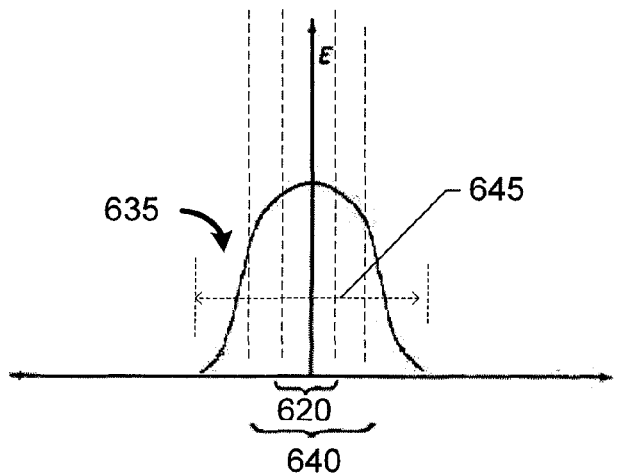
Figure 7A:
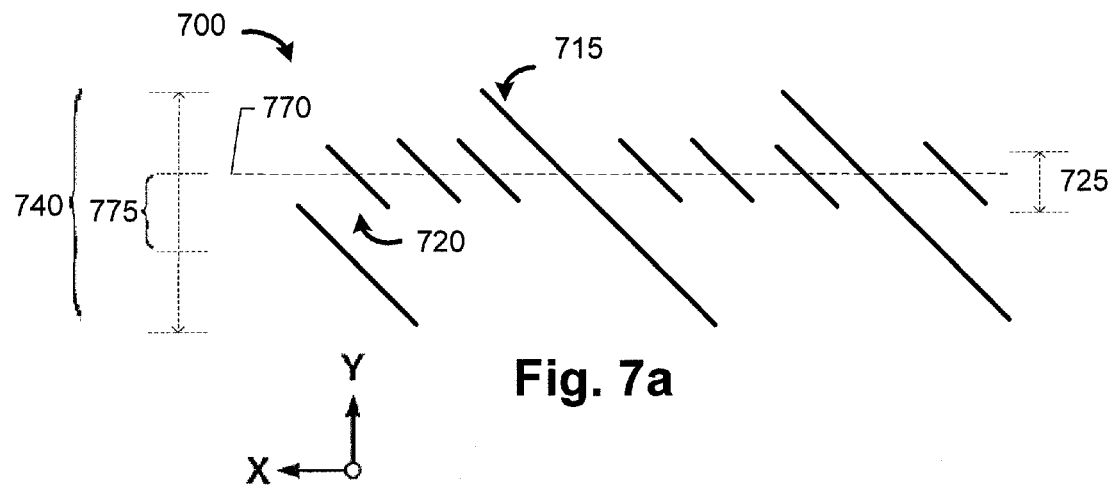
Figure 7B:
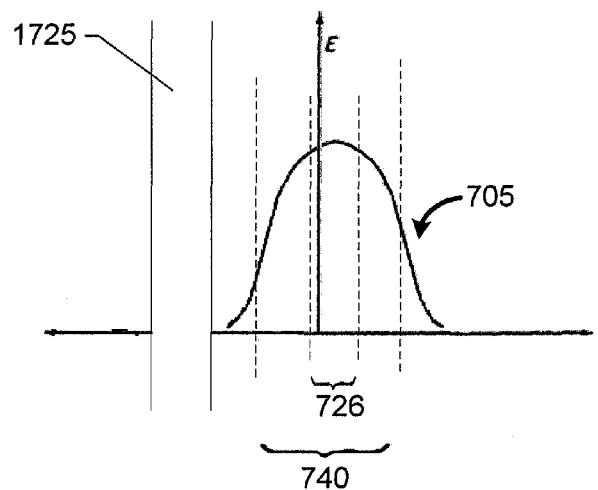
Figure 8A:
Figure 8B:
Figure 14:
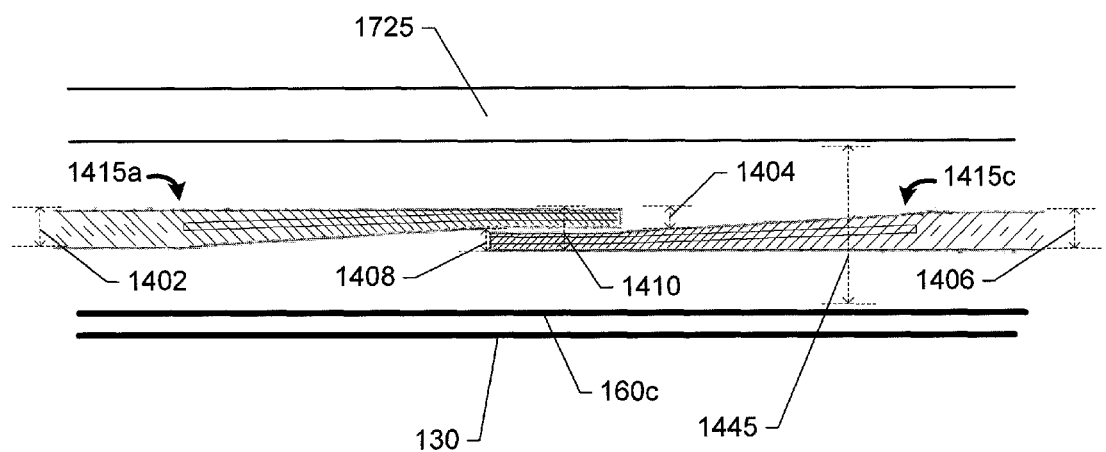
Figure 15:
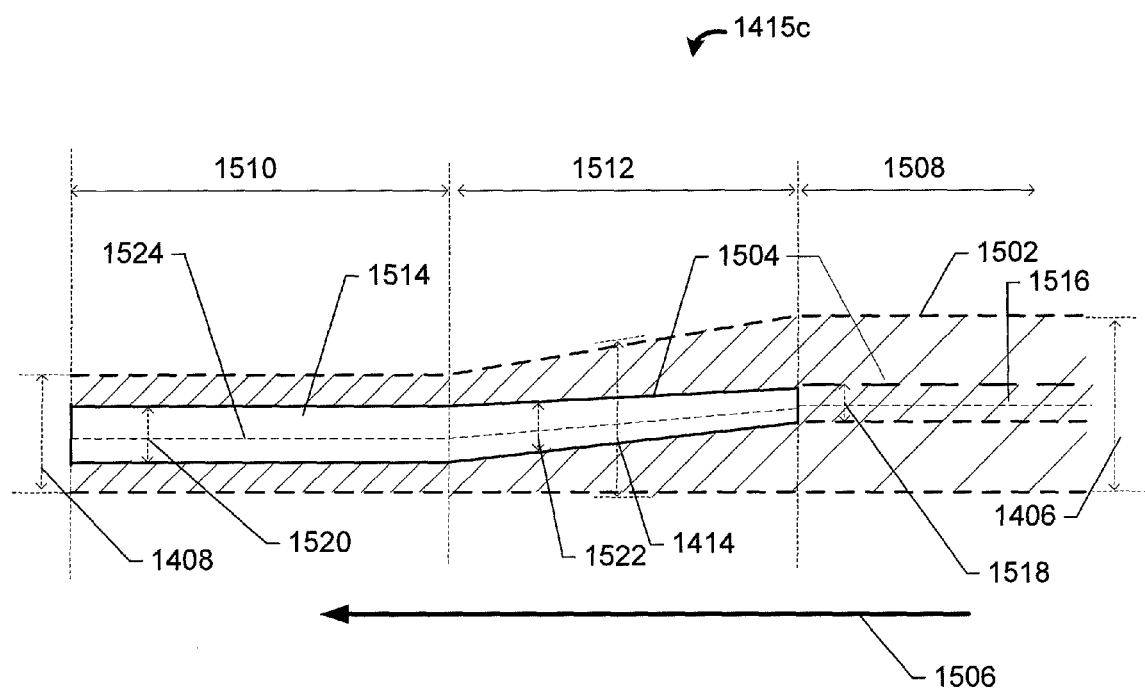
Figure 16A:
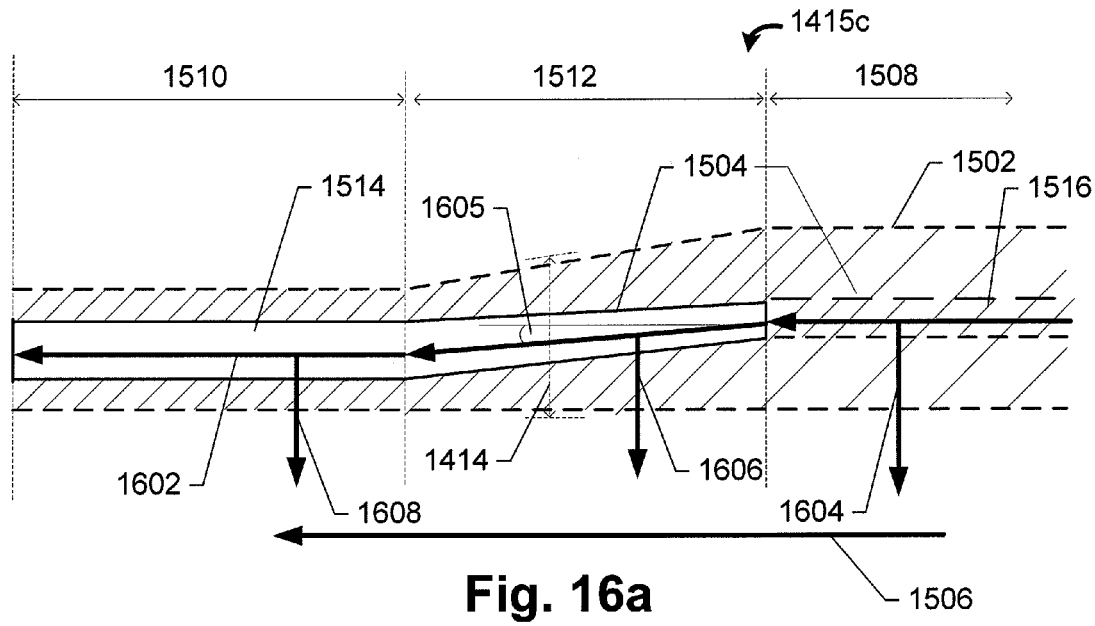
Figure 16B:
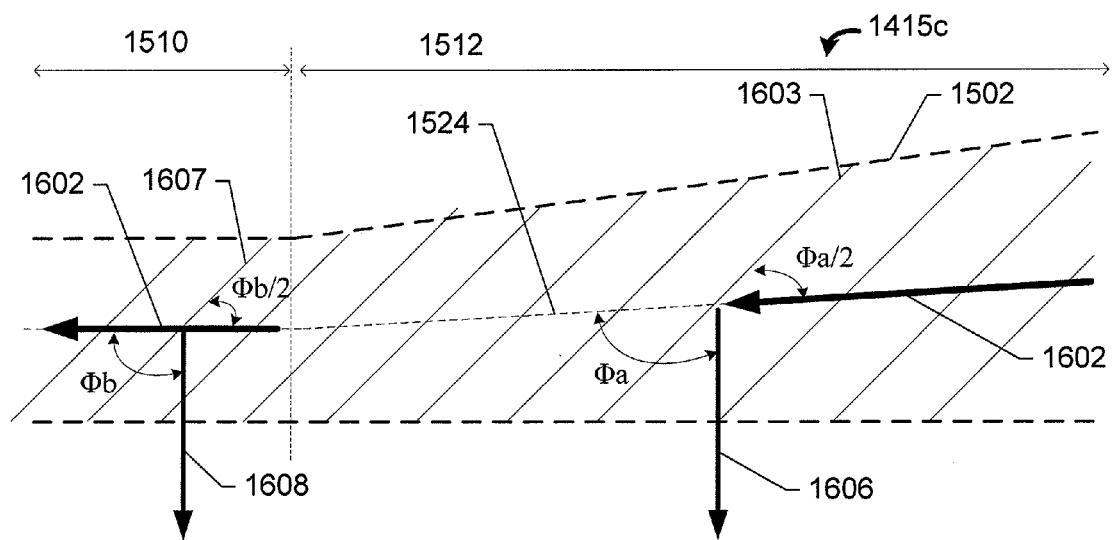
Figure 17A:
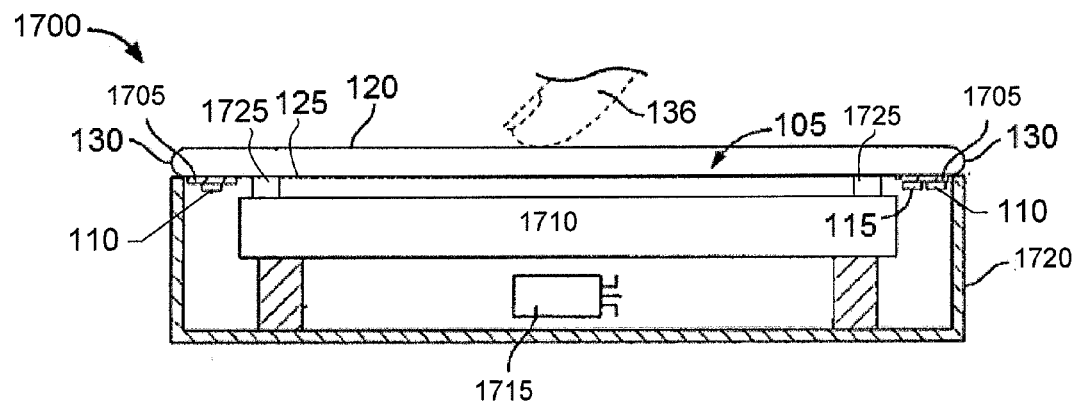
Figure 17B:
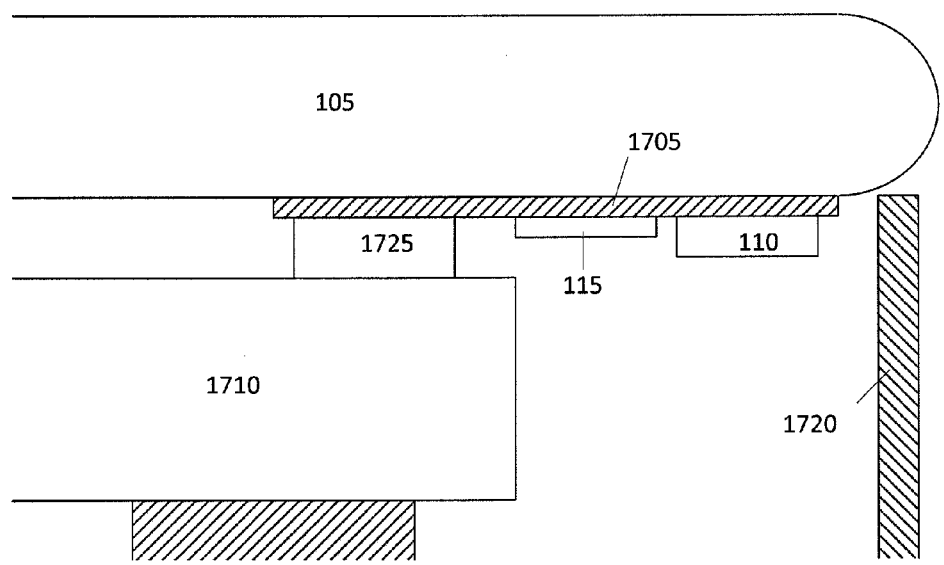
Figure 18:
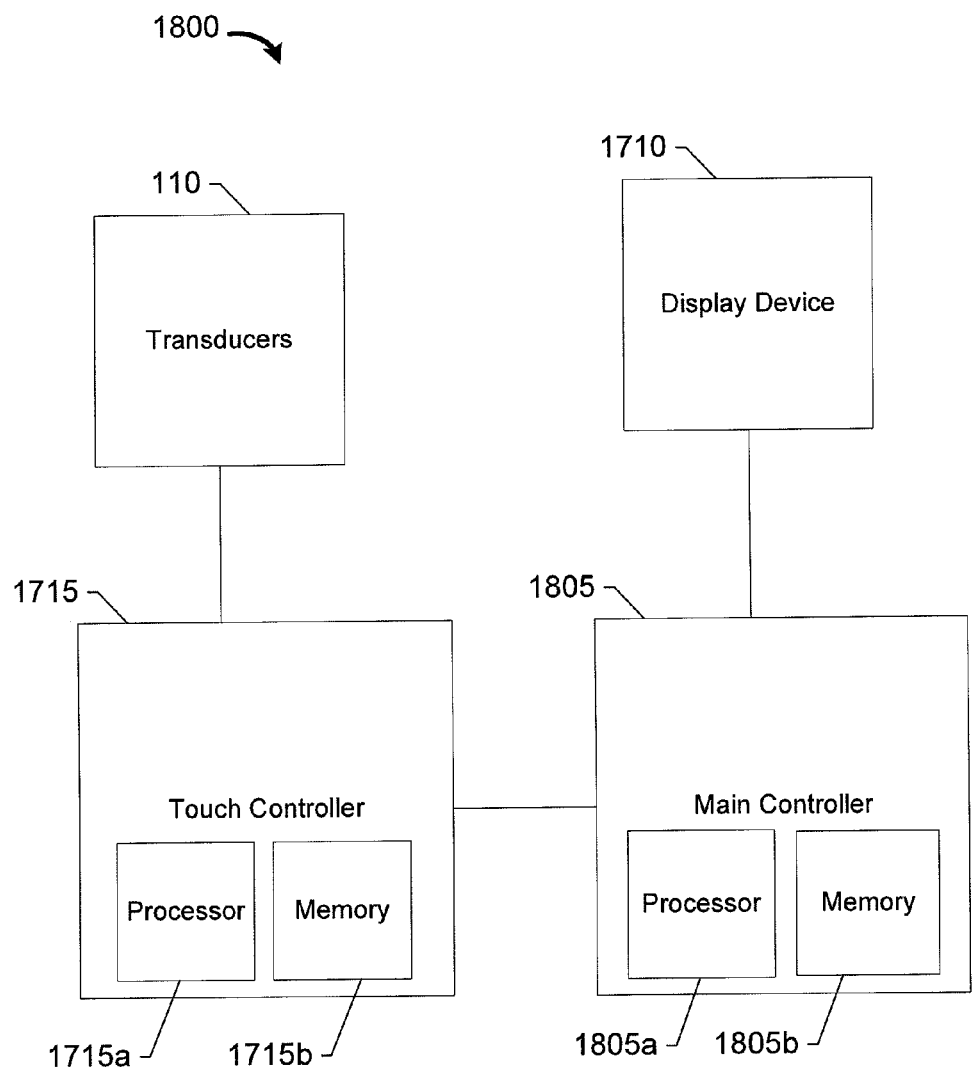
Figure 19:
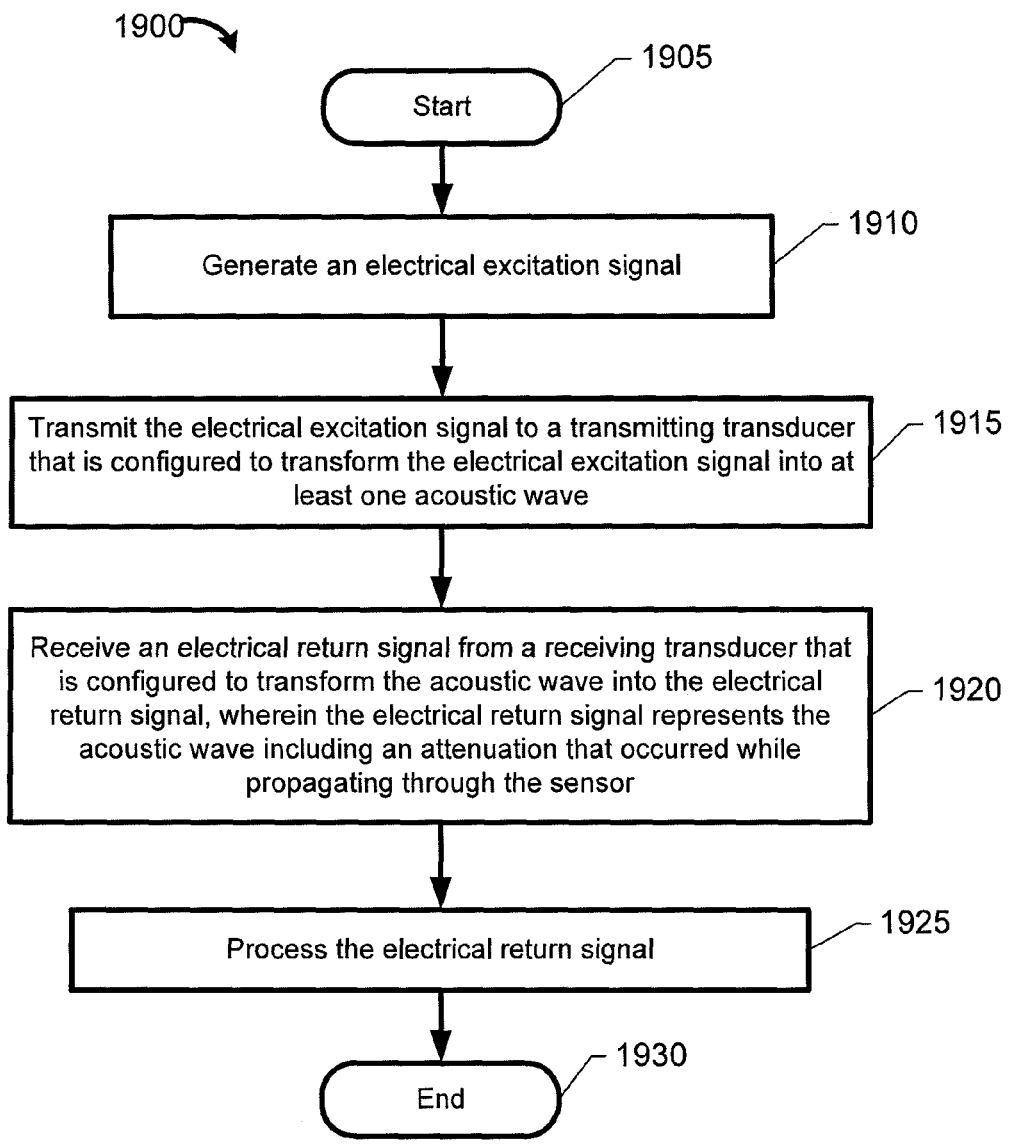
Figure 20:
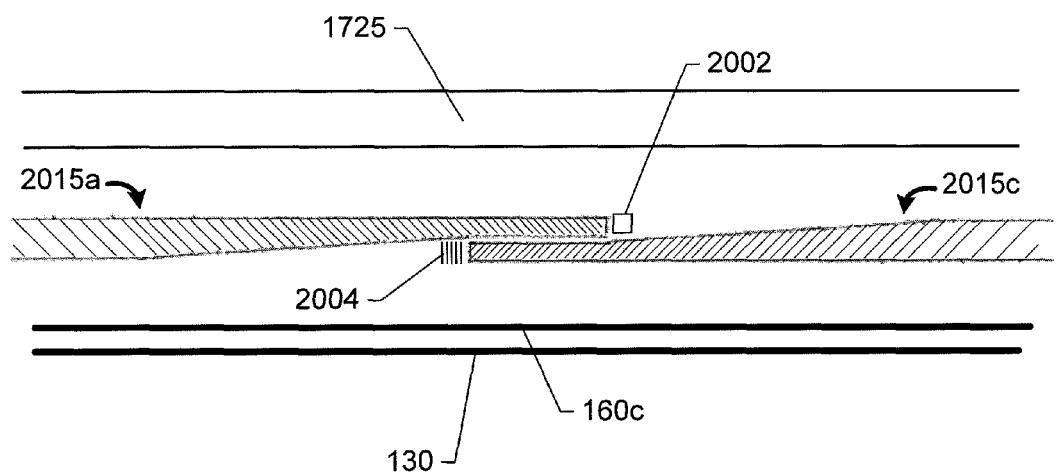

Having thus described the invention in general terms, reference will now be made to the accompanying drawings, which are not necessarily drawn to scale, and wherein:

FIG. 1 shows an example of a simplified cross-sectional view of a touch sensor, configured in accordance with some embodiments;

FIGS. 2a and 2b, respectively, show front (e.g., touch surface) and back (array surface) views of an example substrate of a touch sensor, configured in accordance with some embodiments;

FIGS. 3a and 3b, respectively, show front (e.g., touch surface) and back (array surface) views of an example substrate of a touch sensor, configured in accordance with some embodiments;

FIG. 3c shows a back view of an example substrate of a touch sensor, configured in accordance with some embodiments;

FIG. 4a shows example transducers, configured in accordance with some embodiments;

FIGS. 4b and 4c show example transducers and reflective arrays, configured in accordance with some embodiments;

FIGS. 5a, 5b, 5c and 5d show partial magnified views of a segmented reflective array, configured in accordance with some embodiments;

FIG. 6a shows an example schematic graph of acoustic energy distribution for a surface acoustic wave propagating along a reflective array that does not include a waveguide reflective array, in accordance with some embodiments;

FIG. 6b shows an example schematic graph of acoustic energy distribution for a surface acoustic wave propagating along a segmented reflective array that includes a waveguide reflective array, in accordance with some embodiments;

FIG. 6c shows an example schematic graph of acoustic energy distribution for a surface acoustic wave propagating along a segmented reflective array that includes a narrow major reflective array and a waveguide reflective array, in accordance with some embodiments;

FIG. 7a shows an example segmented reflective array that includes major reflective array and waveguide reflective array, configured in accordance with some embodiments;

FIG. 7b shows an example schematic graph of acoustic energy distribution for a surface acoustic wave propagating along a segmented reflective array that includes a major reflective array and a waveguide reflective array, in accordance with some embodiments;

FIG. 8a shows an example segmented reflective array including focusing-shaped reflector elements, configured in accordance with some embodiments;

FIG. 8b shows an example segmented reflective array including focusing-shaped reflector elements, configured in accordance with some embodiments;

FIGS. 9, 10, 11, 12 and 13 show partial magnified views of a segmented reflective array, configured in accordance with some embodiments;

FIG. 14 shows an example tapered segmented reflective array, configured in accordance with some embodiments;

FIGS. 15, 16a and 16b show partial magnified views of a tapered segmented reflective array, configured in accordance with some embodiments;

FIGS. 17a and 17b show simplified cross-sectional views of a touch sensor device, configured in accordance with some embodiments;

FIG. 18 shows an example control system for a touch sensor device, configured in accordance with some embodiments;

FIG. 19 shows an example of a method for determining coordinate of a touch on a sensor, performed in accordance with some embodiments; and FIG. 20 shows another example of tapered segmented reflective arrays without waveguide cores, configured in accordance with some embodiments.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

In some embodiments, a touch sensor apparatus may be implemented as a touch screen or other type of touch device, such as a touch computer, touch display, mobile device, or interactive digital signage. The touch apparatus may include a touch sensor and an acoustic wave transducer having a piezoelectric element configured to produce a "surface acoustic wave," which is used herein to mean a Rayleigh-type wave, Love-type wave, or other surface bound acoustic wave that may be attenuated by an object placed in its path.

Rayleigh waves maintain a useful power density at the touch surface because they are bound to the touch surface. A Rayleigh wave has vertical and transverse wave components with substrate particles moving along an elliptical path in a vertical plane including the axis of wave propagation, and wave energy decreasing with increasing depth in the substrate. Both shear and pressure/tension stresses are associated with Rayleigh waves. Mathematically, Rayleigh waves exist only in semi-infinite media. In realizable substrates of finite thickness, the resulting wave may be more precisely termed a quasi-Rayleigh wave. Here, it is understood that Rayleigh waves exist only in theory, and, therefore, a reference thereto indicates a quasi-Rayleigh wave. For engineering purposes, it is sufficient for the substrate to be 3 or 4 Rayleigh wavelengths in thickness to support Rayleigh wave propagation over distances of interest to touch sensor design.

Like Rayleigh waves, Love waves are "surface-bound waves" that are guided by one surface. Love waves may require an appropriately layered substrate. In contrast to Rayleigh waves, particle motion for Love waves is transverse horizontal, in that they are parallel to the touch surface and perpendicular to the direction of propagation. Shear stress is primarily associated with a Love wave.

For purposes of this description, acoustic touch sensors using Rayleigh-type waves are discussed according to some example embodiments. However, it is recognized that other types of surface acoustic waves, including Love waves, may be used in accordance with some embodiments.

FIG. 1 shows a simplified cross-sectional view of example touch sensor 100, configured in accordance with some embodiments, but where the thickness (e.g., the height) is exaggerated relative to the length shown. Touch sensor 100 may include substrate 105, acoustic wave transducers 110 (including transducers 110a, 110b, 110c, 110d, 110e, 110f, 110g and 110h discussed below) and reflective arrays 115 (including segmented reflective arrays 115a, 115b, 115c, 115d, 115e, 115f, 115g and 115h discussed below). The substrate of touch sensor 100 is shown as having front surface 120, back surface 125, and connecting surface 130.

Touch sensor 100 may be configured to make use of the fact that surface acoustic waves may propagate around glass or other type of edges, namely connecting surfaces 130, when connecting surfaces 130 are at least relatively smoothly rounded to radii that are at least as large as the surface acoustic waves' wavelength(s). In this case, placing reflective arrays 115 and transducers 110 on the back of touch sensor 100, e.g., back surface 125 (instead of front surface 120), may be leveraged to create a "bezel-free" or "bezelless" touchscreen. As such, connecting surface 130 may be curved or otherwise configured as described in commonly-assigned and co-pending U.S. Patent Application Publication No. 2011/0234545 to Tanaka, et al. for "Bezel-less Acoustic Touch Apparatus," filed Jan. 24, 2011, which is incorporated by reference in its entirety herein and for all purposes. In some embodiments, one or more reflective arrays 115 (e.g., any of the segmented reflective arrays as described herein) and/or transducers 110 may be disposed on front surface 120 of substrate 105.

FIGS. 2a and 2b, respectively, show front and back views of touch sensor 100, configured in accordance with some embodiments. More specifically, FIG. 2a shows a plan view of front surface 120 of touch sensor 100, and FIG. 2b shows a plan view of back surface 125 of touch sensor 100. Transducers 110 are shown in FIG. 2a as dotted lines to provide a frame of reference in relation to FIG. 2b, where transducers 110 are shown in solid lines. To provide a further frame of reference, X-Y coordinate axes are shown in FIGS. 2a and 2b.

Front surface 120 may include touch-sensitive region 205 on which an object 136 may create a contact event to provide input according to a user interface shown on a display (not shown in FIG. 1) disposed behind back surface 125. Object 136 is shown in FIG. 1 as a finger, but touch events that may be sensed by the touch sensor system may result from any object, such as a stylus (e.g., through a coversheet, an anti-reflective coating and/or any other suitable material.

Touch sensitive region 205 may be defined as an inner portion of front surface 120 that is considered the active touch region. Touch sensitive region 205 is shown within dotted lines in FIG. 2a that define left side 205a, right side 205b, bottom side 205c, and top side 205d of touch sensitive region 205 (hereinafter referred to as only, "left side 205a," "right side 205b," "bottom side 205c" and "top side 205d," respectively).

In some embodiments, one or more front surface border regions 135 (e.g., left border region 135a, right border region 135b, bottom border region 135c and top border region 135d) may be defined as portions of front surface 120 along the outer edges and outside of touch sensitive region 205. As shown in FIG. 2a, left border region 135a may be defined as having a width between front surface left edge 150a and left side 205a along the X-axis and a length between front surface bottom edge 150c and front surface top edge 150d along the Y-axis. Right border region 135b may be defined as having a width between right side 205b and front surface right edge 150b along the X-axis and a length between front surface bottom edge 150c and front surface top edge 150d along the Y-axis. Bottom border region 135c may be defined as having a length between front surface left edge 150a and front surface right edge 150b along the X-axis and a width between front surface bottom edge 150c and bottom side 205c along the Y-axis. Top border region 135d may be defined as having a length between front surface left edge 150a and front surface right edge 150d along the X-axis and a width between top side 205d and front surface top edge 150c along the Y-axis. For clarity of presentation, the widths of the border regions 135 as shown in FIGS. 2a and 2b are not drawn to scale, but rather exaggerated.

In some embodiments, one or more back surface border regions 145 (e.g., left border region 145a, right border region 145b, bottom border region 145c and top border region 145d, where "left" and "right" are defined with respect to front surface 120) may be defined as portions of back surface 125, as shown in FIG. 2b. Touch sensitive region 205 (including left side 205a, right side 205b, bottom side 205c, and top side 205d) is shown in FIG. 2b to provide reference points for corresponding locations on back surface 125. Touch sensitive region 205 is at front surface 120, as discussed above. As shown in FIG. 2b, left border region 145a may be defined as having a width between back surface left edge 160a and left side 205a along the X-axis and a length between back surface bottom edge 160c and back surface top edge 160d along the Y-axis. Right border region 145b may be defined as having a width between right side 205b and back surface right edge 160b along the X-axis and a length between back surface bottom edge 160c and back surface top edge 160d along the Y-axis. Bottom border region 145c may be defined as having a length between back surface left edge 160a and back surface right edge 160b along the X-axis and a width between back surface bottom edge 160c and bottom side 205c along the Y-axis. Top border region 145d may be defined as having a length between back surface left edge 160a and back surface right edge 160b along the X-axis and a width between top side 205c and back surface top edge 160c along the Y-axis.

In some embodiments, touch sensor 100 may include an opaque portion, a transparent portion, and/or a partially transparent (e.g., "clouded") portion. When at least one transparent portion and/or substantially transparent portion is included, that portion may be positioned in front of a display device, such that a user viewing front surface 120 may be able to see the display device and its display content through at least a portion of substrate 105, such as touch sensitive region 205. In this regard, touch sensor 100 may be coupled to a control system having a number of functions, including the coordinating of touch functionality with the presentation of displays, some examples of which are discussed below with reference to FIG. 19.

Substrate 105 may also be configured to serve as a propagation medium having one or more surfaces on which surface acoustic waves propagate. For example, substrate 105 may be transparent and isotropic. As such, substrate 105 may comprise any suitable glass (e.g., soda lime glass; boron-containing glass, e.g., borosilicate glass; barium-, strontium-, zirconium- or lead-containing glass; crown glass), and/or other suitable material(s). For example, any glass having a relatively low loss of surface acoustic wave propagation, thereby resulting in better signals, may be preferred according to some embodiments.

One or more acoustic wave transducers 110 may be positioned on, or otherwise coupled to, back surface 125 of substrate 105 at border regions 145. Various types of transducers may be used in accordance with some embodiments. As referred to herein, a "transducer" includes a physical element or set of elements that transforms energy from one form to another, such as between electrical energy and acoustic energy. For example, transducers 110 may include one or more piezoelectric elements that function as acoustically emissive and/or sensitive structures. As such, any machine that utilizes a transducer discussed herein is configured to transform energy from one form to another.

Transducers 110 may be disposed on back surface 125 for transmitting and/or receiving surface acoustic waves. A "transmitting transducer," as used herein, refers to at least one of transducers 110 that is configured to transform electrical energy into acoustic energy. For example, a transmitting transducer may include one or more electrodes, such as two electrodes, that are coupled to a controller. The controller may be configured to generate one or more electrical signals, such as pseudo sinusoidal wave tone bursts at one or more desired frequencies. These electrical signals, which are generated by the controller and provided to the transmitting transducer, are sometimes referred to herein as "excitation signals." The excitations signals may be applied to the electrodes of the transmitting transducer to cause the piezoelectric element therein to vibrate, thereby transforming electrical signals into physical waves having one or more controllable and configurable characteristics (e.g., predetermined resonant frequency, wavelength, etc.).

In some embodiments, the transmitting transducer may further include a wedge shaped coupling block between the piezoelectric element and substrate 105. Vibration of the piezoelectric element may generate bulk waves in the coupling block which in turn couple to the substrate as surface acoustic waves.

A "receiving transducer," as used herein, refers to at least one of transducers 110 that is configured to transform acoustic energy into electrical energy. A receiving transducer may include, for example, electrodes coupled to the controller, a piezoelectric element, a wedge shaped coupling block, and/or any other suitable component(s). As such, surface acoustic waves traveling through the substrate may cause vibrations in the piezoelectric element (e.g., via the coupling block), which in turn causes an oscillation voltage to appear on the electrodes.

At the receiving transducer, the oscillation voltage on the electrodes may include amplitudes that correspond with amplitudes of return surface acoustic waves received at the receiving transducer. Thus, when perturbations, such as those caused by a touch event, attenuate surface acoustic waves propagating on the substrate between a transmitting transducer and receiving transducer, the attenuation also appears at the electrodes of the receiving transducer in the form of voltage attenuation included in the return electrical signal generated by the receiving transducer and provided to a controller.

One or more reflective arrays 115 may be placed on back surface 125 of substrate 105 within border regions 145. Surface acoustic waves may be propagated in a prevailing direction along reflective arrays 115. Reflective arrays 115 may include a plurality of reflector elements (including major reflector elements, semi-major reflector elements and waveguide reflector elements, such as those discussed in the examples herein with respect to, e.g., FIGS. 5a-5d, 7a, 8a, 8b, 9-15, 16a and 16b). One or more of the reflector elements may be configured to purposefully function as inefficient reflectors that may, for example: (1) allow a substantial portion of a surface acoustic wave to pass un-scattered as the wave propagates in a prevailing direction along the reflective array, and/or (2) cause the scattering of a relatively small portion of the surface acoustic wave in scattered prevailing directions. For example, an inefficient reflector element may be designed to reflect less than 1%, 1% to 1.5%, 1.5% to 2%, more than 2%, or any suitable amount (including any suitable range of amounts) of the incident surface acoustic wave energy that arrives at the reflector element. Thus, as a surface acoustic wave propagates along the reflective array, some or all of the reflector elements may each scatter (or "reflect" or "direct") some energy of the surface acoustic wave (the reflected energy is sometimes referred to herein as a "ray" or "redirected" wave), and allow at least some of the energy to pass to the adjacent reflector element in the array. Similarly, the adjacent and/or other subsequent reflector element(s) may reflect some of the acoustic wave's energy and allow at least some of the energy to pass to other reflector elements in the reflective array.

Reflector elements may scatter portions of a surface acoustic wave in controlled directions as a function of the reflector angle of the reflector elements. Thus a reflective array may direct scattered components of a surface acoustic wave generated by a transmitting transducer from back surface 125, across connecting surface 130, and across front surface 120 in the X-axis direction, the Y-axis direction, and/or any other suitable direction(s). A reflective array may also or instead be configured to collect scattered components of a surface acoustic wave that are propagating from front surface 120 (for example, in the direction of the X-axis or Y-axis), across connecting surface 130, and towards a receiving transducer on back surface 125.

Reflective arrays 115 may be formed in any suitable manner. For example, reflective arrays 115 may be manufactured by printing, etching, stamping a metal substrate, and/or shaping a mold for a polymer substrate. As another example, reflective arrays 115 may be formed of a glass frit that is silk-screened onto a glass sheet and/or other substrate material, such as formed by a float process, and cured in an oven to form a chevron, diamond, and/or other suitable non-chevron pattern of raised glass interruptions, which may thereby function as the reflector elements discussed above. As such, the reflector elements may be configured to have heights and/or depths on the order of, for example, 1% of the acoustic wavelength and, therefore, only partially couple and reflect the acoustic wave's energy as discussed above. Because touch sensor 100 may be configured to be positioned in front of a display device, and because reflective arrays 115 are generally optically visible, reflective arrays 115 may be positioned at the periphery of front surface 120 of substrate 105 at border regions 135, outside of touch sensitive region 205, where the reflective arrays 115 may be hidden and protected under a bezel. In some embodiments, reflective arrays 115 may be formed on back surface 125 of substrate 105 at border regions 145. As shown in FIGS. 17a and 17b, front surface 120 of substrate 105 does not need any protective bezel over its periphery, but nevertheless may optionally have a protective bezel.

In some embodiments, touch sensor 100 may include at least four pairs of transducers and reflective arrays. FIG. 2b shows a configuration of eight transducers (e.g., transducers 110a-h) and eight segmented reflective arrays (e.g., segmented reflective arrays 115a-h) for touch sensor 100. A "segmented reflective array," as used herein, refers to a reflective array that is configured to scatter surface acoustic waves across a touch sensitive region for only a portion (e.g., half or slightly more than half) of the touch sensitive region. In that sense, two or more segmented reflective arrays may be arranged along a common border region to scatter surface acoustic waves across the entire touch sensitive region. For example, segmented reflective arrays 115a and 115c may be located in border region 145c defined by the bottom side 205c of the touch sensitive region 205 and back surface bottom edge 160c. For clarity, it is noted that the use of "segmented" in "segmented reflective array" is different from (but may include) the "segmented waveguides" discussed in commonly-assigned U.S. patent application Ser. No. 13/682,621 to Tanaka et al., titled "Segmented Waveguide Core Touch sensor Systems and Methods," which is incorporated by reference herein in its entirety and for all purposes.

Segmented reflective arrays 115a and 115c may collectively define overlap region 140a of substrate 105 where at least portions of segmented reflective arrays 115a and 115c are disposed adjacently with respect to each other. As such, segmented reflective arrays 115a and 115c may be collectively referred to as "adjacent segmented reflective arrays" because of their adjacent portions. As shown in FIG. 2b, segmented reflective arrays 115b and 115d, segmented reflective arrays 115e and 115g, and segmented reflective arrays 115f and 115h may be adjacent segmented reflective arrays including adjacent portions that define overlap regions 140b, 140c and 140d of substrate 105, respectively.

Transmitting transducer 110a, segmented reflective array 115a, segmented reflective array 115b and receiving transducer 110b may be part of a right portion sensing group of transducers and segmented reflective arrays. The right portion sensing group may be associated with the X sensing axis (e.g., to detect X-coordinates of touch events) for touch events on the right half (where "left" and "right" are defined with respect to front surface 120) of touch sensitive region 205. Transmitting transducer 110c, segmented reflective array 115c, segmented reflective array 115d and receiving transducer 110d may be part of a left portion sensing group of transducers and segmented reflective arrays. The left portion sensing group may be associated with the X sensing axis for touch events on the left half of sensitive region 205. For areas of touch sensitive region 205 corresponding with overlap regions 140a and 140b, X-coordinates of touch events may be detected by the both the left portion sensing group and the right portion sensing group. The adjacent configuration of the segmented reflective arrays prevents dead regions in touch sensitive region 205, where X-coordinates of touch events may otherwise be undetected by the left portion sensing group and the right portion sensing group because of a lack of surface acoustic wave scattering.

Similarly, for the Y-sensing axis, transmitting transducer 110e, segmented reflective array 115e, segmented reflective array 115f and receiving transducer 110f may be part of a bottom portion sensing group of transducers and reflective arrays. The bottom portion sensing group may be associated with the Y sensing axis for touch events on the bottom half of sensitive region 205. Transmitting transducer 110g, segmented reflective array 115g, segmented reflective array 115h and receiving transducer 110h may be part of a top portion sensing group of transducers and reflective arrays. The top portion sensing group may be associated with the Y sensing axis for touch events on the top half of sensitive region 205. For areas of touch sensitive region 205 corresponding with overlap regions 140c and 140d, Y-coordinates of touch events may be detected by both the bottom portion sensing group and the top portion sensing group. The adjacent configuration of the segmented reflective arrays prevents dead regions in touch sensitive region 205, where Y-coordinates of touch events may otherwise be undetected by the bottom portion sensing group and the top portion sensing group because of a lack of surface acoustic wave scattering.

FIGS. 3a and 3b show surface acoustic wave travel paths for touch sensor 100 that may be used to detect a touch event, in accordance with some embodiments. Regarding the right portion sensing group of transducers and segmented reflective arrays associated with the X sensing axis, transmitting transducer 110a may be configured to generate and transmit X-coordinate surface acoustic waves (i.e., surface acoustic waves traveling along the Y-axis on front surface 120 of substrate 105 used for determining X-axis coordinates of a touch event), such as surface acoustic wave 170, in a prevailing direction along segmented reflective array 115a. For reference purposes, the prevailing direction of surface acoustic wave propagation along a segmented reflective array may define a beginning and an end of the segmented reflective array. As such, the beginning of segmented reflective array 115a may be defined as a portion of segmented reflective array 115a that is closest to transmitting transducer 110a (e.g., at 116 as shown in FIG. 3b) while the end of segmented reflective array 115a may be defined as a portion of segmented reflective array 115a that is furthest from transmitting transducer 110a (e.g., at 117 as shown in FIG. 3b).

Surface acoustic wave 170 may be scattered in a scattered prevailing direction along the Y-axis across front surface 120 of substrate 105 and be used to determine X-axis coordinate(s) of a touch event. Reflector elements of segmented reflective array 115a may scatter surface acoustic wave 170 as the wave propagates from the beginning to the end of segmented reflective array 115a. The scattered components, or rays (such as ray 172), of surface acoustic wave 170 may ripple outwardly in the scattered prevailing direction toward back surface bottom edge 160c, around connecting surface 130 and toward front surface bottom edge 150c. As such, each ray of the scattered surface acoustic wave 170 may move generally in the positive Y-axis direction (i.e., perpendicular to the sensing X-axis) as small portions of the wave's energy (e.g., 1% at a time) across front surface 120 toward font surface top edge 150d, travel around connecting surface 130, and toward back surface top edge 160d, where the rays are merged as a return acoustic wave by segmented reflective array 115b positioned along border region 145d on back surface 125. Upon traveling to back surface 125, reflector elements of segmented reflective array 115b may direct the scattered, returned surface acoustic wave 170 along segmented reflective array 115b to receiving transducer 110b. Although lines are used in the drawings to represent prevailing directions along segmented reflective arrays and scattered prevailing directions of the movement of acoustic waves and rays of acoustic waves, it is understood by those skilled in the art that waves do not always travel as narrow lines and that the use of lines in the drawings is meant to represent the movement of the center of the waveform's travel path while avoiding unnecessarily over complicating the drawings.

Regarding the left portion sensing group of transducers and segmented reflective arrays associated with the X sensing axis, transmitting transducer 110c may be configured to generate and transmit X-coordinate surface acoustic waves, such as surface acoustic wave 174, in a prevailing direction along segmented reflective array 115c. The beginning of segmented reflective array 115a may be defined as the portion of segmented reflective array 115c that is closest to transmitting transducer 110c while the end of segmented reflective array 115c may be defined as the portion of segmented reflective array 115c that is furthest from transmitting transducer 110c (e.g., at overlap region 140a, as shown in FIG. 2b). As such, the adjacent segmented reflective arrays (e.g., segmented reflective arrays 115a and 115c) may be configured to propagate surface acoustic waves in prevailing directions that are antiparallel, as shown by surface acoustic waves 170 and 174.

Surface acoustic wave 174 may be scattered along the Y-axis across front surface 120 of substrate 105 and be used to determine X-axis coordinate(s) of a touch event. Reflector elements of segmented reflective array 115c may scatter surface acoustic wave 174 as the wave travels from the beginning to the end of segmented reflective array 115c. The scattered components, or rays (such as ray 176), of surface acoustic wave 172 may ripple outwardly toward back surface bottom edge 160c, around connecting surface 130 and toward front surface bottom edge 150c. As such, each ray of the scattered surface acoustic wave 172 may move generally in the positive Y-axis direction (i.e., perpendicular to the sensing X-axis) as small portions of the wave's energy (e.g., 1% at a time) across front surface 120 toward font surface top edge 150d, travel around connecting surface 130, and toward back surface top edge 160d, where the rays are merged as a return acoustic wave by segmented reflective array 115d. Upon traveling to back surface 125, reflector elements of segmented reflective array 115d may direct the scattered, returned surface acoustic wave 174 along segmented reflective array 115d to receiving transducer 110d.

Regarding the bottom portion sensing group of transducers and segmented reflective arrays associated with the Y sensing axis, transmitting transducer 110e may be configured to generate and transmit Y-coordinate surface acoustic waves (i.e., surface acoustic waves traveling along the X-axis on front surface 120 of substrate 105 used for determining Y-axis coordinates of a touch event), such as surface acoustic wave 178, in a prevailing direction along reflective array 115e. Surface acoustic wave 178 may be scattered along the X-axis across front surface 120 of substrate 105 and be used to determine Y-axis coordinate(s) of a touch event. Reflector elements of segmented reflective array 115e may scatter surface acoustic wave 178 as rays (such as ray 180) while the wave travels from the beginning to the end of segmented reflective array 115e. Each of the surface acoustic wave rays of surface acoustic wave 178 may ripple toward back surface left edge 160a, around connecting surface 130 and toward front surface left edge 150a. As such, a number of rays, each having a small portion of the energy (e.g., 1% of the energy) of surface acoustic wave 178 may move generally in the positive X-axis direction (i.e., perpendicular to the sensing Y-axis) across front surface 120 toward front surface right edge 150b, around connecting surface 130, and toward back surface right edge 160b to reflective array 115f. Upon traveling to back surface 125, reflector elements of segmented reflective array 115f may direct the scattered surface acoustic wave 178 along segmented reflective array 115f to receiving transducer 110f.

Regarding the top portion sensing group of transducers and segmented reflective arrays associated with the Y sensing axis, transmitting transducer 110g may be configured to generate and transmit Y-coordinate surface acoustic waves (i.e., surface acoustic waves traveling along the X-axis on front surface 120 of substrate 105 used for determining Y-axis coordinates of a touch event), such as surface acoustic wave 182, in a prevailing direction along reflective array 115g. Surface acoustic wave 182 may be scattered along the X-axis across front surface 120 of substrate 105 and be used to determine Y-axis coordinate(s) of a touch event. Reflector elements of segmented reflective array 115g may scatter surface acoustic wave 182 as rays (such as ray 184) while the wave travels from the beginning to the end of segmented reflective array 115g. Each of the surface acoustic wave rays of surface acoustic wave 182 may ripple toward back surface left edge 160a, around connecting surface 130 and toward front surface left edge 150a. As such, a number of rays, each having a small portion of the energy (e.g., 1% of the energy) of surface acoustic wave 182 may move generally in the positive X-axis direction (i.e., perpendicular to the sensing Y-axis) across front surface 120 toward front surface right edge 150b, around connecting surface 130, and toward back surface right edge 160b to reflective array 115h. Upon traveling to back surface 125, reflector elements of segmented reflective array 115h may direct the scattered surface acoustic wave 182 along segmented reflective array 115h to receiving transducer 110h.

FIG. 3c shows a back view of an example touch sensor 300 that includes six transducers (e.g., transducers 110a, 110b, 110c, 110d, 310a and 310b) and six reflective arrays (e.g., reflective arrays 115a, 115b, 115c, 115d, 315a and 315b). As discussed above, transmitting transducer 110a, segmented reflective array 115a, segmented reflective array 115b and receiving transducer 110b may be part of the right portion sensing group associated with the X sensing axis for touch events on the right half (where "left" and "right" are defined with respect to front surface 120) of touch sensitive region 205. Similarly, transmitting transducer 110c, segmented reflective array 115c, segmented reflective array 115d and receiving transducer 110d may be part of the left portion sensing group of transducers associated with the X sensing axis for touch events on the left half of sensitive region 205. However, for the Y sensing axis, touch sensor 300 does not include the bottom portion sensing group and the top portion sensing group. Instead, transducers 310a and 310b and (non-segmented) reflective arrays 315a and 315b comprise a full substrate sensing group associated with the Y sensing axis.

For example, transmitting transducer 310a may be configured to generate and transmit Y-coordinate surface acoustic waves (i.e., surface acoustic waves traveling along the X-axis on front surface 120 of substrate 105 used for determining Y-axis coordinates of a touch event), such as surface acoustic wave 380, in a prevailing direction along reflective array 315a. Surface acoustic wave 380 may be scattered along the X-axis across front surface 120 of substrate 105 and be used to determine Y-axis coordinate(s) of a touch event. Reflector elements of reflective array 315a may scatter surface acoustic wave 380 as rays (such as ray 382) while the wave travels from the beginning to the end of reflective array 315a. Each of the surface acoustic wave rays of surface acoustic wave 380 may ripple toward back surface left edge 160a, around connecting surface 130 and toward front surface left edge 150a. As such, a number of rays, each having a small portion of the energy (e.g., 1% of the energy) of surface acoustic wave 380 may move generally in the positive X-axis direction (i.e., perpendicular to the sensing Y-axis) across front surface 120 toward front surface right edge 150b, around connecting surface 130, and toward back surface right edge 160b to reflective array 315b. Upon traveling to back surface 125, reflector elements of reflective array 315b may direct the scattered surface acoustic wave 380 along reflective array 315b to receiving transducer 310b.

In some embodiments, the use of additional transducers and segmented reflective arrays may allow for larger substrates (e.g., substrates larger than 32 inches diagonally), and thus larger touch sensors, because the distance that surface acoustic waves must travel between a transmitting transducer and a receiving transducer within the substrate is reduced. As surface acoustic waves propagate across the substrate, their acoustic energy gradually dampens. Thus shorter travel paths for surface acoustic waves allow for larger substrates because the acoustic energy of the surface acoustic waves will not dampen to unsuitably low levels (e.g., as to be completely dissipated, undetectable by a receiving transducer, and/or unsuitably low for determining touch events) while traveling from a transmitting transducer to a receiving transducer. In some embodiments, it may be desirable to increase the operating frequency to enable higher touch sensitivity, to enable narrower borders via use of waves with smaller wavelength, as well as to enable use of thinner and hence lower weight glass, even at the expense of increasing the surface acoustic wave attenuation rate as a result of increased frequency. As such, otherwise unacceptable signal loss may be compensated with the use of additional transducers and segmented reflective arrays. Other suitable touch sensor and segmented reflective array configurations (e.g., using twelve transducers) for are disclosed in commonly-assigned U.S. Pat. No. 5,854,450 to Kent for "Acoustic Condition Sensor Employing a Plurality of Mutually Non-Orthogonal Waves," which is incorporated by reference in its entirety herein and for all purposes.

In some embodiments, it may be desirable to decrease the widths of border regions 135 and/or border regions 145. Smaller border region widths may allow a greater percentage of front surface 120 to be allocated to touch sensitive region 205. As such, substrate 105 may have smaller dimensions that allow touch sensor 100 to fit into smaller devices without requiring corresponding reductions to touch screen size. In another example, the dimensions of substrate 105 may be increased without a corresponding increase in border region width. Furthermore, a touch screen having narrower border regions may convey the impression of a less cumbersome, sleek design, making the product more aesthetically pleasing or otherwise attractive to some customers.

In some embodiments, reducing the width of the border regions may be accomplished by reducing the beam width of surface acoustic waves propagating in the border regions. The beam width of a surface acoustic wave may be defined as a width within which surface acoustic wave energy contributes to reflective array function. In other words, as a surface acoustic wave propagates along a segmented reflective array in an associated border region, the beam width (or maximum beam width) of the surface acoustic wave may define a minimum width requirement of the associated border region. If the border region is narrower than the beam width, portions of the surface acoustic wave energy that would otherwise contribute to reflective array function may not reach a receiving transducer, which may result in unsuitably low signal amplitudes at the receiving transducer.

However, surface acoustic waves, like many other types of waves, tend to angularly spread if collimated, emitted and/or scattered with a small aperture. As such, the beam width of a surface acoustic wave propagating along a reflective array may tend to increase as the surface acoustic wave propagates further from a transmitting transducer. Accordingly, the border region width, having a minimum value as defined by the beam width, may need to be increased in some embodiments to support larger sized touch sensors having increased border region length.

A relationship between beam width, and thus border region width, and transmitting transducer size is shown in FIG. 4a, in accordance with some embodiments. As shown, transmitting transducer 402a has a width, "W1," which may be wider and thus have a larger aperture, than transmitting transducer 402b having width "W2." As a result of the different aperture sizes, surface acoustic wave 404a propagating outwards from transmitting transducer 402a has a smaller angular divergence than surface acoustic wave 404b propagating outwards from transmitting transducer 402b. Therefore, despite surface acoustic wave 404b having a smaller near-transducer beam width, e.g. at distance 406, than surface acoustic wave 404a, surface acoustic wave 404b may have a larger far-transducer beam width than surface acoustic wave 404a, e.g., at distance 408.

As discussed above, the minimum border region width may be defined by the maximum beam width of a surface acoustic wave propagating along the border region. As a result of angular divergence, however, decreasing maximum beam width (e.g., at regions further from the transmitting transducer) may be more complicated than reducing transducer width.

As shown in FIG. 4b, an optimal width for transmitting transducer 410 to minimize the beam width at the end of a reflective array 412 having a length L (e.g., from the beginning to the end of reflective array 412) may be given by:

$$\text{Transducer Width} = \sqrt{(\lambda * L)}, \qquad \text{Equation 1}$$

where λ is the wavelength of surface acoustic waves. Equation 1 is a mathematical approximation derived without accounting for any waveguide effects of reflective array 412. The wavelength of surface acoustic waves may refer to a wavelength that an ideal transducer may be configured to generate and transmit through the substrate. Real, physical transducers may not be so perfect, thus it is appreciated that "wavelength," as used herein, may refer to a dominant wavelength of surface acoustic waves generated and transmitted by a transducer.

Also shown in FIG. 4b, transmitting transducer 410 may be configured to send surface acoustic wave 414 along reflective array 412. At zone 416 of reflective array 412 closest to transmitting transducer 410, beam width 418 (as indicated by the solid curves pointing both above and below reflective array 412) of surface acoustic wave 414 may be substantially equal to the width of transmitting transducer 410. In order to couple sufficient amounts of the acoustic signal, reflective array 412 may have a width dimension 420 that is substantially the same as the transducer width given by Equation 1.

It is appreciated, however, that the width dimension of a reflective array may not be equal to transducer width in some embodiments. For example, a focusing transducer may be used as discussed in commonly-assigned U.S. Pat. No. 6,636,201 to Gomes et al., titled "Acoustic Touchscreen Having Waveguided Reflector Arrays," which is incorporated by reference in its entirety herein and for all purposes.

At zone 422 of reflective array 412 furthest from transmitting transducer 410, beam width 418 has increased as a result of angular divergence. Here, beam width 418 is at its largest value and may be given by:

$$\text{Maximum Beam Width} = \sqrt{(2 \ast \lambda \ast L)}, \quad \text{Equation 2}$$

where λ is the wavelength of surface acoustic waves and L is the length of reflective array 412. Like Equation 1, Equation 2 is a mathematical approximation derived without accounting for any waveguide effects of reflective array 412. At zone 422, beam width 418 is larger than width dimension 420 of reflective array 412. In that sense, while width dimension 420 may define a visible width of reflective array 412, the minimum border region width is greater than width dimension 420 to support beam width 418. The portions of the border region in which beam width 418 falls outside of width dimension 420 may be analogized to a road shoulder. When designing a road or highway, it is not sufficient to consider only the width of the road's asphalt (i.e., width dimension 420). Sufficient real estate must be allotted to provide room for the road's shoulder as well. It is the combined width of the road's asphalt and shoulders (i.e., beam width 418 at zone 422) that determines the width of the real estate needed for the road. Likewise, in the design of a touch sensor border region, such as front surface border regions 135 and back surface border regions 145 as shown in FIGS. 2*a* and 2*b* respectively, the border region width must be sufficiently wide to account for the beam width. As such, the maximum beam width may place a limitation upon the minimum border region width allowable without unacceptably compromising reflective array function and signal strength at the receiving transducers.

FIG. 4*c* shows an example beam width 424 (as indicated by the solid curves pointing both above and below reflective array 412) when the waveguide effects of reflective array 412 are considered. Lines 426 represents a ray of SAW energy that escapes reflective array 412 near its beginning where the reflector density and its effects of SAW velocity (as discussed in further detail below) is low and hence waveguide effects are weak. Line 428 represents a SAW ray that in a naïve analysis would leave the array, but is pulled back in due to stronger waveguide effects where the density of reflectors is greater. The "waveguide effects" considered here may also be described as "refraction effects" or "total internal reflection effects." To borrow optics terminology, the "index of refraction" is larger (that is the wave phase velocity is smaller) inside the reflective array 412 than outside. Similar to how portions of light propagating within water incident to an water/air surface at a glancing angle will tend to be internally reflected and remain in the water, internal reflection will tend to keep SAW energy within reflective array 412. Despite the maximum value of beam width 424 being less than the result given by Equation 2 (e.g., $\sqrt{(2 \ast \lambda \ast L)}$), beam width 424 may nonetheless may place a limitation upon the minimum border region width allowable without unacceptably compromising reflective array function and signal strength at the receiving transducers.

Techniques for generating smaller beam widths may be desirable to enable smaller border region widths and/or larger touch sensitive regions. In other words, it may be desirable for the maximum beam width as a function of reflective array length to be smaller than the result given by Equation 2 for a given wavelength λ of surface acoustic waves and length of reflective array L.

In some embodiments, the use of segmented reflective arrays may allow for the maximum value of beam widths, and thus border region widths, to be smaller despite larger border region lengths (e.g., as may be required for larger substrates and/or touch sensors). For example, each segmented reflective array may have a length L from the beginning to the end of the segmented reflective array. As such, two adjacent segmented reflective arrays (e.g., segmented reflective arrays 115*a* and 115*c*, as shown in FIG. 2*b*) may each provide for a maximum beam width given by Equation 2 (or less when accounting for waveguide effects, as discussed above) despite the fact that the adjacent segmented reflective arrays collectively allow surface acoustic waves (e.g., surface acoustic Waves 170 and 174 shown in FIG. 3*b*) to propagate along the adjacent segmented reflective arrays for a collective distance that is closer to 2 L (e.g., without accounting for adjacent portions of the segmented reflective array in overlap region 140*a*) than L.

In some embodiments, other techniques for smaller border region widths and/or larger touch sensitive regions may be used in addition and/or alternatively to segmented reflective arrays. For example, one or more of the segmented reflective arrays may be comprised of a major reflective array and a waveguide core. The waveguide core may be configured to reduce the beam widths of surface acoustic waves propagating along the length of the segmented reflective array. In particular, the waveguide core may concentrate acoustic energy of the surface acoustic waves, thus reducing the beam widths of the surface acoustic waves. As will be discussed in greater detail below, when the beam widths of surface acoustic waves are reduced, the width dimension of the segmented reflective arrays (e.g., the major width dimension of the major reflective array) and/or transducer widths (or aperture sizes) may also be reduced (e.g., smaller than the result given by Equation 1). Despite such a reduction in the width dimension of the segmented reflective arrays, the fraction of the surface acoustic waves intercepted by the segmented reflective arrays may be maintained, increased and/or kept sufficiently high for touch sensing purposes. Furthermore, the widths of border regions 145, wherein segmented reflective arrays 115 are located, may also be reduced because of the reduced beam widths as discussed above.

Figure 5A:
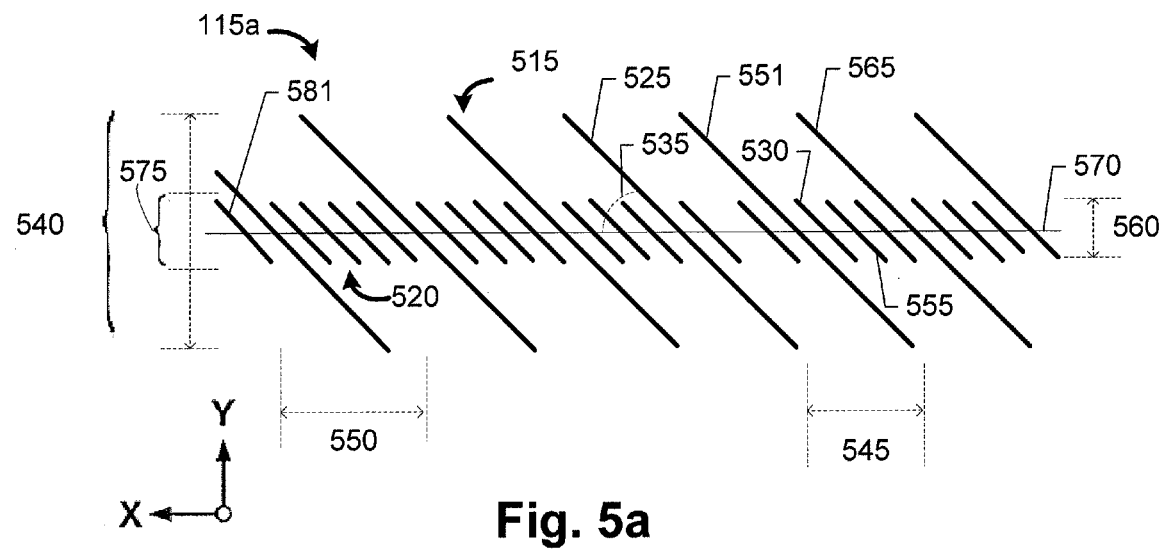

FIG. 5*a* shows a partial magnified view of segmented reflective array 115*a* in zone 210 (as shown in FIG. 2*b*), configured in accordance with some embodiments. Segmented reflective array 115*a* is merely an example segmented reflective array, and the discussion herein may be applicable to other segmented reflective arrays 115.

Segmented reflective array 115*a* (as well as other reflective arrays discussed herein) may include major reflective array 515 and a waveguide core. A waveguide core, as used herein, refers to structures capable of concentrating acoustic energy of surface acoustic waves. As such, a waveguide core may include a waveguide reflective array (e.g., waveguide reflective array 520) and/or a solid core waveguide. Major reflective array 515 may include a plurality of major reflector elements, such as major reflector elements 525, 551 and 565. As shown, each major reflector element may be disposed parallel to and/or otherwise not touching each other along the length dimension (running along X-axis direction) of segmented reflective array 115*a*. As such, a surface acoustic wave propagating in a prevailing direction along the length of segmented reflective array 115*a* (e.g., in the negative X-axis direction from transmitting transducer 110*a*) may have components scattered (e.g., in the negative Y-axis direction) as described above with reference to FIGS. 3*a* and 3*b*.

In some examples, the major reflector elements may form a 45° reflector angle with respect to the length dimension of segmented reflective array 115*a*, as shown at 535 for major reflector element 525. However, the major reflector elements may not be parallel and may form other reflector angles in suitable embodiments, as discussed in commonly-assigned U.S. Pat. No. 5,854,450, incorporated by reference above, and U.S. patent application Ser. No. 13/688,149 to Huangs et al., titled "Curved Profile iTouch" (disclosing curved profile touch sensors), which is incorporated by reference in its entirety herein and for all purposes.

In some embodiments, the major reflector elements may be disposed such that center-to-center spacing between neighboring major reflector elements define a distance equal to at least one positive integer multiple of the surface acoustic waves' wavelength. "Neighboring major reflector elements," as used herein, refers to two major reflector elements that are disposed adjacently, or such that there is no intervening third major reflector element within the center-to-center spacing of the two neighboring reflector elements (although there may or may not be one or more waveguide reflector elements disposed in the space between neighboring major reflector elements). The center-to-center spacing distances between two neighboring major reflector elements may be given by:

$$\text{Center-to-center Spacing} = n*\lambda, \qquad \text{Equation 3}$$

where n is a positive integer and $\lambda$ is the wavelength of surface acoustic waves. Equation 3 applies to touchscreen designs in which it is desired that arrays scattering surface acoustic waves by an angle of 90°; more generally the spacing is chosen to assure coherent scattering at the desired scattering angle.

In some embodiments, the center-to-center spacing between major reflector elements define regions between the major reflector elements (e.g., region 545 defined by the center-to-center spacing of major reflector element 551 and major reflector element 565). These regions may be slightly smaller than the center-to-center spacing because the major reflector elements having a certain thickness. The center-to-center spacing, and thus the regions, may be comparatively greater at a first portion of a reflective array closer to a transmitting transducer and smaller at a second portion of the major reflective array further from the transmitting transducer. Surface acoustic waves may have a high acoustic energy at the transmitting transducer. As the waves traverse along a reflective array, portions of its energy are scattered by each major reflector element, leaving smaller portions of acoustic energy incident on each successive major reflector element. As such, an uneven spacing of major reflector elements as described may counteract this effect, as well as the effects of wave attenuation in the substrate material, to provide a more even acoustic energy distribution in the scattered rays (e.g., rays 172, 176, 180, and 184 shown in FIGS. 3*a* and 3*b*).

Figure 5B:
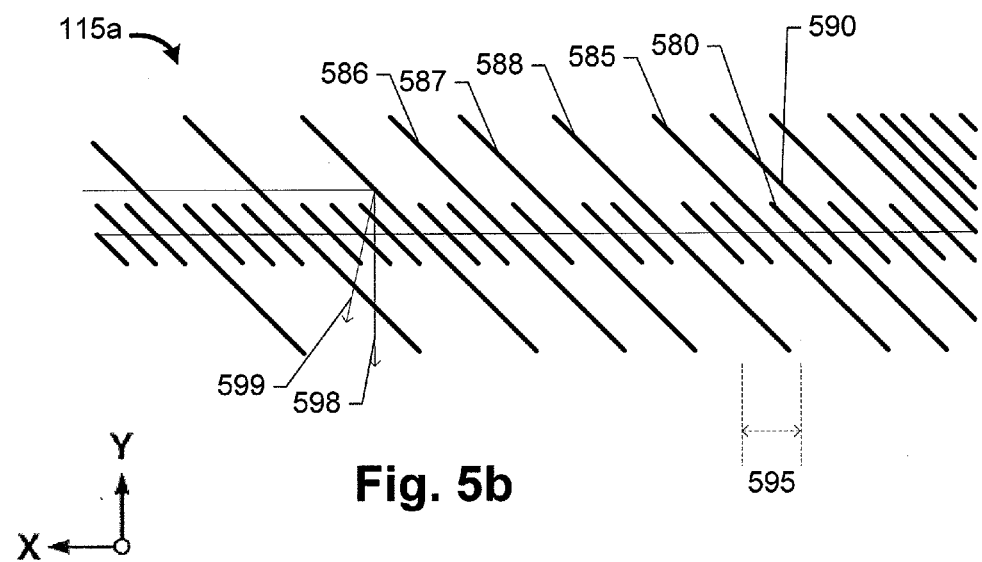

As shown in FIG. 5*a*, region 550 that is closer to transmitting transducer 110*a* (shown in FIG. 2*b*) corresponds with greater center-to-center spacing than region 545 that is further from transmitting transducer 110*a*. For example, region 550 may correspond with a center-to-center spacing of n*$\lambda$, where n is 5, while region 545 may correspond with a center-to-center spacing of n*$\lambda$, where n is 4. In FIG. 5*b*, which shows a partial magnified view of reflective array 115*a* in zone 215 (as shown in FIG. 2*b*) that is further from transmitting transducer 110*a* than zone 210, the major reflector elements may have center-to-center spacings that are closer together than in zone 210. For example, region 595 between major reflector elements 585 and 590 may correspond with a center-to-center spacing of n*$\lambda$, where n is 2.

The coherence requirement that center-to-center reflector spacing must be an integer number of wavelengths limits the freedom to adjust reflector spacing for signal equalization purposes. Nevertheless, for engineering purposes, it remains possible to equalize signals to a good approximation. In some embodiments, for signal equalization purposes, a forbidden spacing of a non-integer number of wavelengths would otherwise be desired for the spacing in Equation 3 (e.g., n=2.5). To achieve a similar effect for signal equalization purposes, the reflective array may be designed to alternate between two or more n integers around a non-integer value. For example, major reflector element 586 may be disposed 2 spacing quantum from major reflector element 587 while major reflector element 587 may be disposed 3 spacing quanta from reflector element 588, which may provide an effect of 2.5 spacing quanta. As such, it is appreciated that the overall spacing between adjacent reflector elements may trend smaller in the prevailing direction for power equalization purposes even as some n values may increase along the prevailing direction.

In some embodiments, the center-to-center spacing between neighboring major reflector elements may be comparatively greater at a first portion of a reflective array closer to a receiving transducer and greater at a second portion of the major reflective array further from the receiving transducer. For example and as shown in FIG. 2*b*, zone 220 of segmented reflective array 115*b* may have major reflector elements that are spaced further apart than major reflector elements at zone 225 because zone 220 is closer to receiving transducer 110*b* than zone 225.

Returning to FIG. 5*a*, one or more major reflector elements (e.g., major reflector elements 525, 551 and 565) of segmented reflective array 115*a* may define a major width dimension 540. As discussed above, a thin major width dimension 540 may be desirable in some embodiments. As such, the beam width of a surface acoustic wave may be decreased with the addition of a waveguide core, such as waveguide reflective array 520, which may allow for a decreased major width dimension 540 in some embodiments. In some embodiments, major width dimension 540 may be between 2 mm and 10 mm.

Waveguide reflective array 520 may include a plurality of waveguide reflector elements, such as waveguide reflector elements 530 and 555. In some embodiments, a waveguide reflector element may define a waveguide width dimension 560. As shown in FIG. 5*a*, waveguide width dimension 560 may be smaller than major width dimension 540. In some embodiments, waveguide width dimension 560 is configured to be sufficiently narrow to prevent multi-mode waveguiding by waveguide reflective array 520. For example, waveguide width dimension 560 may be between one-tenth and one-third of major width dimension 540 in some embodiments.

In some embodiments, a waveguide reflector element of waveguide reflective array 520 may have a reflector angle substantially parallel to reflector angles of an adjacent major reflector element and/or an adjacent major reflector element. For example, the waveguide reflector elements may have reflector angles that follow with the same formulaic layout or other type of arrangement of the major reflector elements. In some embodiments, each major reflector element of segmented reflective array 115*a* may be disposed parallel to each other along the length dimension of segmented reflective array 115*a* (e.g., at 45° with respect to the length dimension) such that a surface acoustic wave propagating in a prevailing direction along the length of segmented reflective array 115*a* will have components scattered in scattered prevailing directions as described above with reference to FIGS. 3*a* and 3*b*. Similarly, waveguide reflector elements may be disposed parallel to the major reflector elements to prevent blind spots across the touch region caused by large center-to-center spacings (i.e., where n is large in Equation 3) between major reflector elements. As such, the waveguide reflector elements may further help increase linearity, smooth the acoustic signal at receiving transducer 110d, and reduce interference effect caused by spurious waves scattered by major reflective array 515.

As discussed above, the surface acoustic waves that generated by transducers and scattered by the reflector elements have prevailing directions, which represents the center of the waveform's travel path. In actuality, however, not all surface acoustic waves travel in the prevailing directions. Surface acoustic waves that do not propagate in the prevailing directions become so-called "spurious waves." If these spurious waves reach the receiving transducers, they may result in noise and may throw off proper judgment by the controller. Thus, another advantage of the waveguide reflector elements is that they attenuate spurious waves scattered by the major reflective array as the spurious waves pass through the waveguide reflector elements, such as spurious wave 599 shown in FIG. 5b that is reflected in a direction different from the prevailing direction shown by ray 598.

One or more waveguide reflector element may be disposed between two of the major reflector elements. For example, waveguide reflector element 530 may be disposed between major reflector element 551 and major reflector element 565. Similarly, waveguide reflector element 555 may also disposed between major reflector element 551 and major reflector element 565. In some embodiments, each waveguide reflector element may be disposed between two neighboring major reflector elements. However, not all waveguide reflector elements must necessarily be disposed between two major reflector elements. For example, one or more of waveguide reflector elements may also be disposed at the beginning (and/or end) of a segmented reflective array, such as waveguide reflector element 581 disposed at the beginning of segmented reflective array 115a as shown in FIG. 5a.

In some embodiments, waveguide reflector elements may be disposed within regions formed between the center-to-center spacing of neighboring major reflector elements such that the waveguide reflector element forms an interval with an adjacent major reflector element and/or an adjacent waveguide reflector element that is equal to at least one positive integer multiple of the surface acoustic waves' wavelength. In other words, the center-to-center interval between a waveguide reflector element and any other reflector element may be given by:

$$\text{Center-to-center Interval} = n*\lambda, \qquad \text{Equation 4}$$

where n is a positive integer and $\lambda$ is the wavelength of surface acoustic waves. In some examples, as shown in FIGS. 5a and 5b, n is equal to 1 for each waveguide reflector element, such that waveguide reflector elements fill in at regions formed between two major reflector elements greater than $\lambda$ (i.e., where n is 2 or greater in Equation 3). While Equation 4 has a similar form as Equation 3, the numerical values of "n" may be different. For example, waveguide reflector element 530 is disposed an interval $\lambda$ (e.g., n=1 in Equation 4) away from major reflector element 551 and an interval $\lambda$ away from waveguide reflector element 555. Similarly, waveguide reflector element 580 is disposed an interval $\lambda$ away from major reflector element 585 and an interval $\lambda$ away from major reflector element 590. It is appreciated that n may vary for each waveguide reflector element in Equation 4. As such, one or more waveguide reflector elements may be omitted, as shown between major reflector elements 525 and 551 in FIG. 5a.

While Equation 3 and Equation 4 give spacing equations that are positive integer multiples of $\lambda$, the spacing may be different in some embodiments, particularly if the reflective array is configured to scatter surface acoustic waves by an angle different from 90°. In general, the spacing may be integer multiples of a spacing quantum chosen to support coherent scattering by the desired angle, such as discussed in commonly-assigned U.S. patent application Ser. No. 13/688,149, incorporated by reference above.

In some embodiments, the waveguide reflector elements of waveguide reflective array 520 may be disposed such that they define waveguide centerline 570, as shown in FIG. 5a. Waveguide centerline 570 may be defined as a line running perpendicular to waveguide width dimension 560 at the center of waveguide dimension 560. Waveguide reflective array 320 may be positioned relative to major reflective array 515 such that waveguide centerline 570 is within a center third 575 of major width dimension 540. In some embodiments, as shown in FIGS. 5a, 5b, 5c, 5d, 4b and 4c, waveguide centerline 570 is within the middle of major width dimension 340. Waveguide centerline 570 may also be offset from the middle of major width 540, as shown in FIGS. 5a and 5b for waveguide centerline 570 and major width dimension 540.

As discussed above, waveguide reflective array 520 may be configured to concentrate the energy of surface acoustic wave 170 as the wave propagates along segmented reflective array 115a. Conceptually, segmented reflective array 115a may behave similar to an optical waveguide that includes a core material surrounded by cladding material, with the guided wave having a slower propagation speed (e.g., higher index of refraction) in the core region than the cladding region. As surface acoustic wave 170 propagates along reflective array 115a, its propagation speed is slowed by each reflector element. Thus, waveguide reflective array 520 (having a dense spacing of waveguide reflector elements) may function as a core region that is surrounded by major reflective array 515 (having a less dense spacing of major reflector elements), which may function as a cladding region. As a result of the varying propagation speeds, the beam width of surface acoustic wave 170 may be decreased.

Figure 5C:
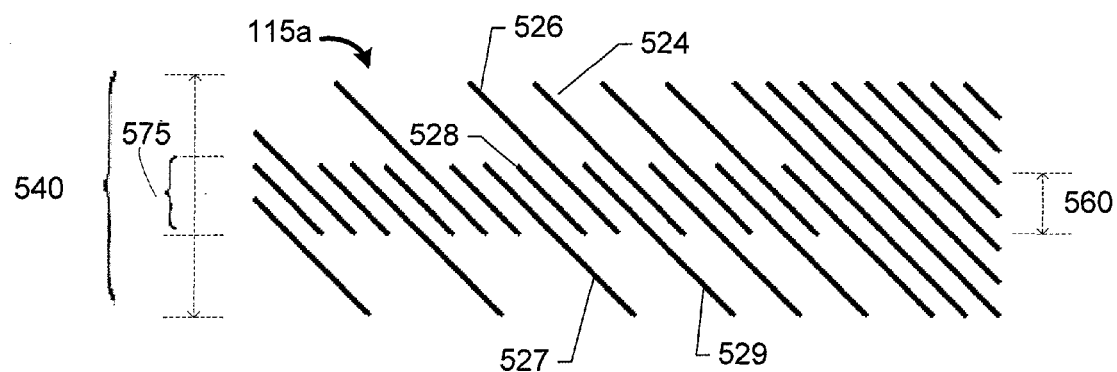
Figure 5C:
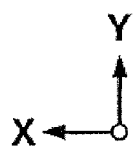

FIG. 5c shows another example partial magnified view of segmented reflective array 115a in zone 215 (as shown in FIG. 2b), configured in accordance with some embodiments. Segmented reflective array 115a shown in FIG. 5c is merely an example segmented reflective array, and the discussion herein may be applicable to other segmented reflective arrays 115. In some embodiments, one or more reflector elements of a major reflective array be semi-major reflector elements, such as semi-major reflector elements 526 and 527. Semi-major reflector element 526 is a top semi-major reflector element in that its length runs from the bottom of a waveguide reflector element, such as waveguide reflector element 528, to the top of major width dimension 540. Semi-major reflector element 527 is a bottom semi-major reflector element in that its length runs from the top of a waveguide reflector element, such as waveguide reflector element 528, to the bottom of major width dimension 540. In that sense, top semi-major reflector element 526 and bottom semi-major reflector element 527 may collectively define major width dimension 540 and/or waveguide width dimension 560. The terms "top" and "bottom" are used herein with respect to reflective array 115a as viewed from the orientation as shown in FIG. 5c.

In some embodiments, the semi-major reflector elements may be staggered in that a top semi-major reflector element is not a neighbor to another top semi-major reflector element and a bottom semi-major reflector element is not a neighbor to another bottom semi-major reflector element. For example, top semi-major reflector element 526 is a neighbor to waveguide reflector element 528 and bottom semi-major reflector element 529. In another example, bottom semi-major reflector element 529 is a neighbor to top semi-major reflector elements 524 and 526.

Figure 5D:
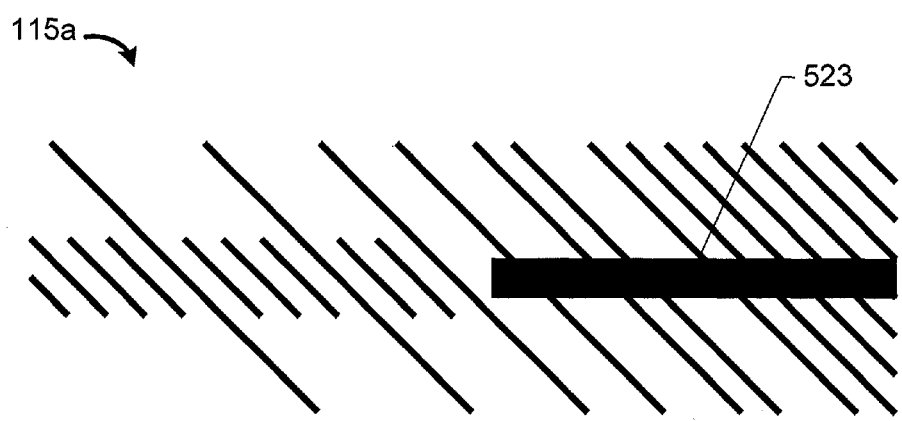
Figure 5D:
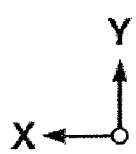

FIG. 5d shows another example partial magnified view of segmented reflective array 115a in zone 215 (as shown in FIG. 2b), configured in accordance with some embodiments. Segmented reflective array 115a as shown in FIG. 5d is also only an example segmented reflective array and the discussion herein may be applicable to other segmented reflective arrays 115. In some embodiments, segmented reflective array 115a may include a solid core waveguide, such as solid core waveguide 523. Solid core waveguides are discussed in greater detail in commonly-assigned U.S. Pat. No. 6,636,201, incorporated by reference above.

As discussed above, segmented reflective array 115a in zone 215 is further from transmitting transducer 110a than in zone 210 (as shown in FIG. 2b), thus the major reflector elements may have center-to-center spacings that are closer together in zone 215 than in zone 210. When the center-to-center spacings of the major reflector elements are $\lambda$ (i.e., where n is 1 in Equation 3) or close to $\lambda$ (i.e., where n is small but greater than 1 in Equation 3), there is little room left for waveguide reflector elements. Thus, solid core waveguide 523 may be disposed instead of a waveguide reflective array including waveguide reflector elements in portions of segmented reflective array 115a. In some embodiments, a waveguide reflective array may be disposed along a first length portion of a segmented reflective array while a solid core waveguide may be disposed along a second length portion of the segmented reflective array (e.g., at or near overlap regions).

FIG. 6a shows a schematic graph of acoustic energy distribution for surface acoustic wave 605 along major width dimension 610 for a segmented reflective array that does not include a waveguide core. For comparison, FIG. 6b shows a schematic graph of acoustic energy distribution for surface acoustic wave 615 along major width dimension 610 for a segmented reflective array that includes a waveguide core (e.g., a waveguide reflective array) having waveguide width dimension 620. As discussed above, the waveguide reflective array having waveguide width dimension 620 may act as a core region that concentrates a greater portion of the acoustic energy of surface acoustic wave 615 within major width dimension 610. Thus, beam width 630 of surface acoustic wave 615 may be thinner than beam width 625 of surface acoustic wave 605.

As shown in FIG. 6b, the presence of the waveguide reflective array having waveguide width dimension 620 may cause major reflector width dimension 610 to be larger than beam width 630 of surface acoustic wave 615. In some embodiments, optimal array performance may be achieved by reducing major reflector width dimension 610, allowing some of the acoustic wave energy to propagate outside of major reflector width dimension 610. FIG. 6c shows a schematic graph of acoustic energy distribution for surface acoustic wave 635 along major width dimension 640 for a segmented reflective array that includes the waveguide reflective array having waveguide width dimension 620. Major width dimension 640 is smaller than major width dimension 610. However, the presence of the waveguide reflective array having waveguide width dimension 620 concentrates the acoustic energy of surface acoustic wave 635 such that beam width 645 is smaller than beam width 625. In other words, the fraction of the surface acoustic wave 635 intercepted by major reflector elements having major width dimension 640 remains sufficient for touch sensing purposes despite the fact that major width dimension 640 is smaller than major width dimension 610. As such, major width dimension 640, in units of wavelength, of segmented reflective array 115a may be less than $\sqrt{(\lambda*L)}$ given by Equation 1 above.

FIG. 7a shows a segmented reflective array 700 that includes major reflective array 715 and waveguide reflective array 720, configured in accordance with some embodiments. Major reflective array 715 may include a major width dimension 740 having a center third 775. Waveguide reflective array 720 may include a waveguide width dimension 725 having a waveguide centerline 770, which is disposed at the topmost of center third 775 of major width dimension 740. FIG. 7b shows a schematic graph of acoustic energy distribution for surface acoustic wave 705 along major width dimension 740. As shown, acoustic energy of surface acoustic wave 705 is concentrated near centerline 726 and offset from the center of major width dimension 740. Thus, waveguide reflective array 715 may be configured to concentrate acoustic energy of surface acoustic wave 705 at different portions of major width dimension 740.

In some embodiments, one or more of the major reflector elements and/or one or more of the waveguide reflector elements may include a focusing shape. As used herein, "focusing-shaped" reflector elements are reflector elements that tend to concentrate acoustic wave energy towards the center of the reflector elements. FIG. 8a shows an example reflective array 800 that includes lens-shaped reflector elements having a parabolic profile. FIG. 8b shows an example reflective array 805 that includes diamond-shaped reflector elements. These and other possible focusing-shaped reflector elements are described in further detail in commonly-owned U.S. Pat. No. 7,274,358 to Kent for "Focusing-shaped Reflector Arrays for Acoustic Touchscreens," which is incorporated by reference in its entirety herein and for all purposes. As discussed, any or all of the waveguide reflector elements and/or major reflector elements may include a focusing shape. For example, two waveguide reflector elements may have different focusing shapes. Similarly, two major reflector elements may have different focusing shape. In some examples, the shape and/or focusing shape of at least one major reflector element may be different from the shape and/or focusing shape of at least one waveguide reflector element.

Figure 9:
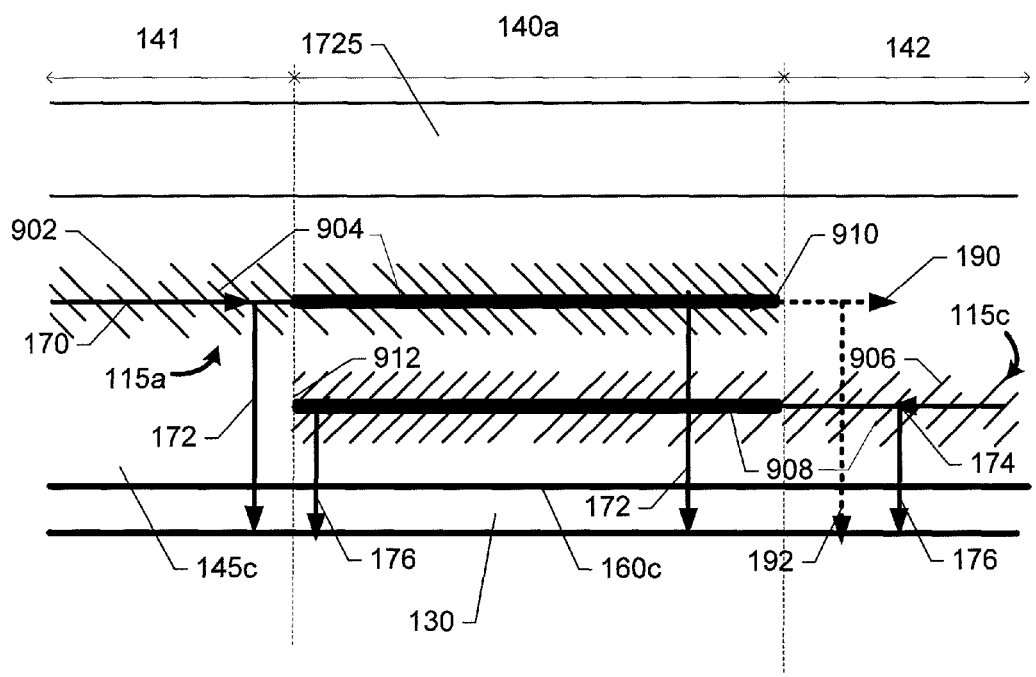

FIG. 9 shows an example partial magnified view of adjacent segmented reflective arrays 115a and 115c in zone 230 (as shown in FIG. 2b), configured in accordance with some embodiments. Segmented reflective array 115a may include major reflective array 902 and waveguide core 904. Major reflective array 902 may be configured to propagate (and redirect) at least a portion of surface acoustic waves in first prevailing direction along major reflective array 902, as shown by surface acoustic wave 170, defining a beginning and an end (e.g., at 910) of major reflective array 902. For example, major reflective array 902 may scatter surface acoustic wave 170 propagating in the first prevailing direction in a scattered prevailing direction, as shown by rays 172 in FIG. 9.

Segmented reflective array 115c may include major reflective array 906 and waveguide core 908. Major reflective array 906 may be configured to propagate (and redirect) at least a portion of surface acoustic waves in a second prevailing direction along major reflective array 906, as shown by surface acoustic wave 174, defining a beginning and an end (e.g., at 912) of major reflective array 906. The first prevailing direction may be antiparallel to the second prevailing direction. "Antiparallel," as used herein, means that the first prevailing direction and the second prevailing direction are parallel but opposite (e.g., like cars traveling in opposite directions of a road). For example, major reflective array 906 may scatter surface acoustic wave 174 propagating in the second prevailing direction in the scattered prevailing direction, as shown by rays 176 in FIG. 9.

Segmented reflective arrays 115a and 115c (as well as major reflective arrays 902 and 906) may collectively define overlap region 140a of substrate 105, where portions of segmented reflective arrays 115a and 115c may be disposed adjacently. For example, the end of the segmented reflective array 115a (as well as major reflective array 902) may extend beyond the end of the segmented reflective array 115c (as well as major reflective array 906), thereby defining an adjacent portion of segmented reflective array 115a. Similarly, the end of the segmented reflective array 115c (as well as major reflective array 906) may extend beyond the end of the segmented reflective array 115a (as well as major reflective array 902), thereby defining an adjacent portion of segmented reflective array 115c.

In some embodiments, waveguide core 904 of segmented reflective array 115a and waveguide core 908 of segmented reflective array 115c may be disposed within overlap region 140a (e.g., in the adjacent portions). In FIG. 9, waveguide cores 904 and 908 are shown as solid core waveguides in overlap region 140a and waveguide reflective arrays in non-adjacent portions 141 and 142 of segmented reflective arrays 115a and 115c, respectively. The transition between solid core waveguides and waveguide reflective arrays need not necessarily be at the boundary of overlap region 140a, but may be inside or outside of overlap region 140a. For example, the transition may be located wherever the reflector spacing of major reflector arrays 902 and 906 becomes sufficiently small that waveguide reflector arrays become less ineffective and sufficiently small that there are no longer concerns related to large reflector spacing.

As discussed above with respect to FIG. 5d, solid core waveguides may be used to provide waveguide effects when the center-to-center spacings of the major reflector elements leave little or no room for waveguide reflector elements (e.g., where n=1 in Equation 3). In some embodiments, a solid core waveguide may be disposed outside of overlap region 140a segmented reflective array 115a and/or segmented reflective array 115c (e.g., as shown in FIG. 5d). Furthermore, some embodiments of the segmented reflective array 115a and/or 115c may include a waveguide reflective array in some or all of overlap region 140a.

In overlap region 140a, adjacent portions of segmented reflective arrays 115a and 115c may allow scattered surface acoustic waves (e.g., as shown by rays 172) to pass in the scattered prevailing direction from one segmented reflective array through the other segmented reflective array. For example, ray 172 is shown as passing in the scattered prevailing direction from segmented reflective array 115a, through segmented reflective array 115c, and toward back surface bottom edge 160c of substrate 105. Such an arrangement may prevent blind spots in touch sensitive region 205 that may otherwise occur at the ends of the segmented reflective arrays without the adjacent portions in overlap region 140a.

As discussed above with respect to FIG. 5d, solid core waveguides may be used to provide waveguide effects when the center-to-center spacings of the major reflector elements leave little or no room for waveguide reflector elements (e.g., where n=1 in Equation 3). In some embodiments, a solid core waveguide may be disposed outside of overlap region 140a segmented reflective array 115a and/or segmented reflective array 115c (e.g., as shown in FIG. 5d). Furthermore, some embodiments of the segmented reflective array 115a and/or 115c may include a waveguide reflective array in some or all of overlap region 140a.

In some embodiments, a beam dump may be disposed at the end of segmented reflective array 115a and/or 115c. A "beam dump," as used herein, may refer to any structure that is capable of preventing surface acoustic waves propagating in the prevailing direction along a segmented reflective array past the end of the segmented reflective array from reaching a (receiving and/or transmitting) transducer, which may result in inaccurate touch sensing. For example, surface acoustic wave 170 may not be entirely scattered and/or dissipated when it reaches the end of segmented reflective array 115a at 910, and may continue to travel in the prevailing direction as shown by ray 190. As such, surface acoustic wave 170 may improperly continue to propagate past segmented reflective array 115a at 910 and into non-adjacent portion 142 of segmented reflective array1 15c. If ray 190 is allowed to propagate past the end of segmented reflective array 115 as shown, its acoustic energy may be received at a transducer, resulting in inaccurate touch sensing. For similar reasons, the beam dump may be further configured to prevent surface acoustic waves from propagating in the scattered prevailing direction past the end of a segmented reflective array, as shown by ray 192.

Figure 10:
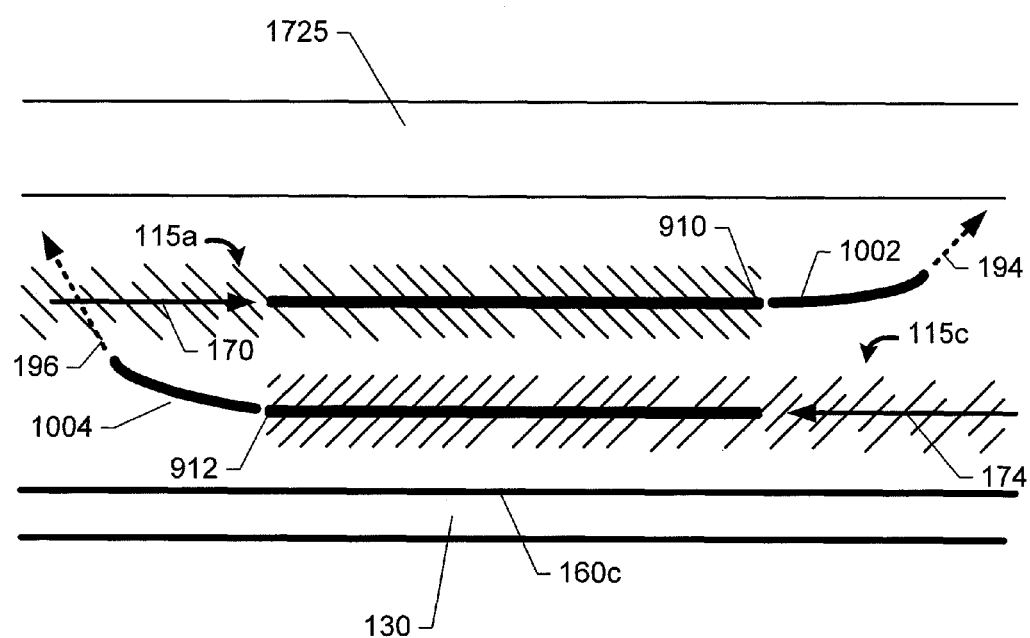

FIG. 10 shows example solid core waveguide deflectors that may act as beam dumps, configured in accordance with some embodiments. In some embodiments, one or more segmented reflective arrays may include a solid core waveguide deflector at the end of the segmented reflective arrays that is configured to guide surface acoustic waves away from a transducer (e.g., away from prevailing directions as shown by rays 190 and 192 in FIG. 9). For example, segmented reflective array 115a may include solid core waveguide deflector 1002 disposed at the end of segmented reflective array 115a at 910. Additionally and/or alternatively, segmented reflective array 115c may include solid core waveguide deflector 1004 disposed at the end of segmented reflective array 115c at 912.

As shown in FIG. 10, solid core waveguide deflectors 1002 and 1004 may be curved to guide surface acoustic waves such that they do not reach a transducer. For example, the curvature of solid core waveguide deflector 1002 may be configured to guide surface acoustic wave 170 in a direction shown by ray 194 that is different than the prevailing directions shown by rays 190 and 192 in FIG. 9. Similarly, the curvature of solid core waveguide deflector 1004 may be configured to guide surface acoustic wave 174 in a direction shown by ray 196.

In some embodiments, touch sensor 100 may further include acoustically absorptive bonding layer 1725 that may act as a boundary in which surface acoustic waves are strongly attenuated and/or dissipated. The acoustically absorptive bonding layer may be disposed on a side of the segmented reflective arrays that is opposite to the edges of the substrate. For example, acoustically absorptive bonding layer 1725 may be disposed on a side of segmented reflective arrays 115a and 115c that is opposite of back surface bottom edge 160c. As discussed below in greater detail with respect to FIG. 17, absorptive bonding layer 1725 may be further configured to bond substrate 105 to a display device. As shown in FIG. 10, solid core waveguide deflectors 1002 and 1004 may be configured to direct rays 194 and 196, respectively, toward acoustically absorptive bonding layer 1725, where their acoustic energy may be absorbed. As such, the absorbed acoustic energy may not reach a transducer and improperly affect touch sensing.

Figure 11:
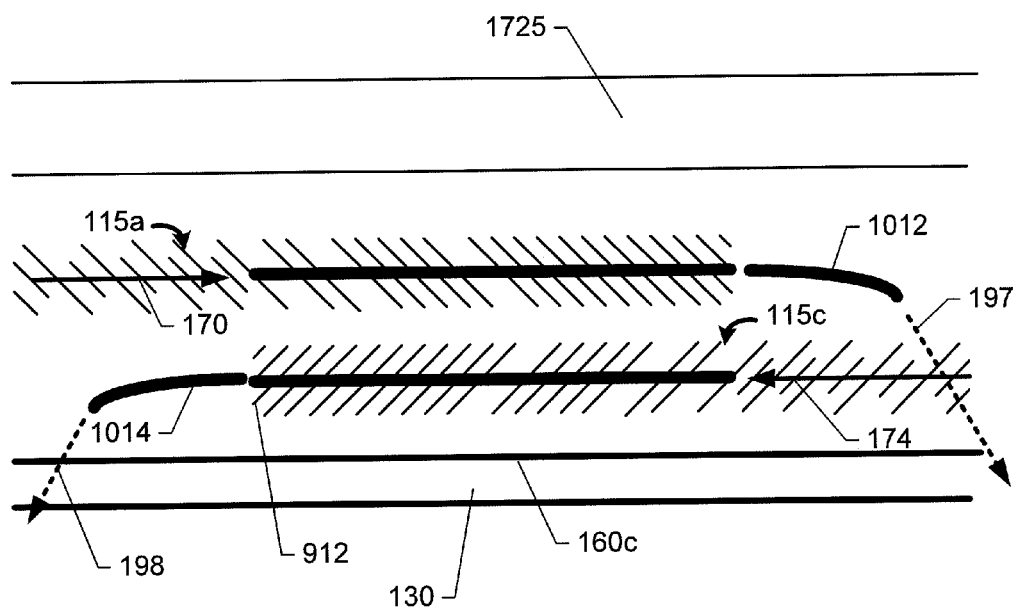

FIG. 11 shows another example of solid core waveguide deflectors that may act as beam dumps, configured in accordance with some embodiments. Here, the curvature of solid core waveguide deflector 1012 may be configured to guide surface acoustic wave 170 in a direction shown by ray 197 that is different than the prevailing directions shown by rays 190 and 192 in FIG. 9. Similarly, the curvature of solid core waveguide deflector 1014 may be configured to guide surface acoustic wave 174 in a direction shown by ray 198. Rays 197 and 198 may propagate around back surface bottom edge 160c and front surface bottom edge 150c via connecting surface 130, and across front surface 120 in a prevailing direction that is not perpendicular to the X-sensing axis (e.g., unlike rays 172 and 176 shown in FIG. 3a). As rays 197 and 198 propagate through substrate 105, they may dissipate during their propagation prior to reaching a transducer, may be scattered by segmented reflective arrays in non-scattering directions until they dissipate prior to reaching a transducer, and/or may be absorbed by the acoustically absorptive bonding layer upon returning to back surface 125 of substrate 105.

As discussed above with reference to FIG. 3b, a segmented reflective array (e.g., segmented reflective array 115a) may be configured (e.g., via reflector elements and their reflector angles) to direct surface acoustic waves propagating in a prevailing direction along the segmented reflective array (e.g., as received from a transmitting transducer) in a scattered prevailing direction. Additionally and/or alternatively, a segmented reflective array (e.g., segmented reflective array 115b) may be configured to collect surface acoustic waves propagating in scattered prevailing direction and to direct them in a prevailing direction along the segmented reflective array toward a transducer. However, because solid core waveguide deflectors 1012 and 1014 may be configured to guide surface acoustic waves in directions other than the prevailing directions along the segmented reflective arrays and the scattered prevailing directions, the guided surface acoustic waves will not be incident upon the segmented reflective arrays in the prevailing directions and the scattered prevailing directions. In that sense, waveguide deflectors 1012 and 1014 may be configured to ensure that the guided surface acoustic waves are not scattered and/or collected by the segmented reflective arrays toward a transducer.

Figure 12:
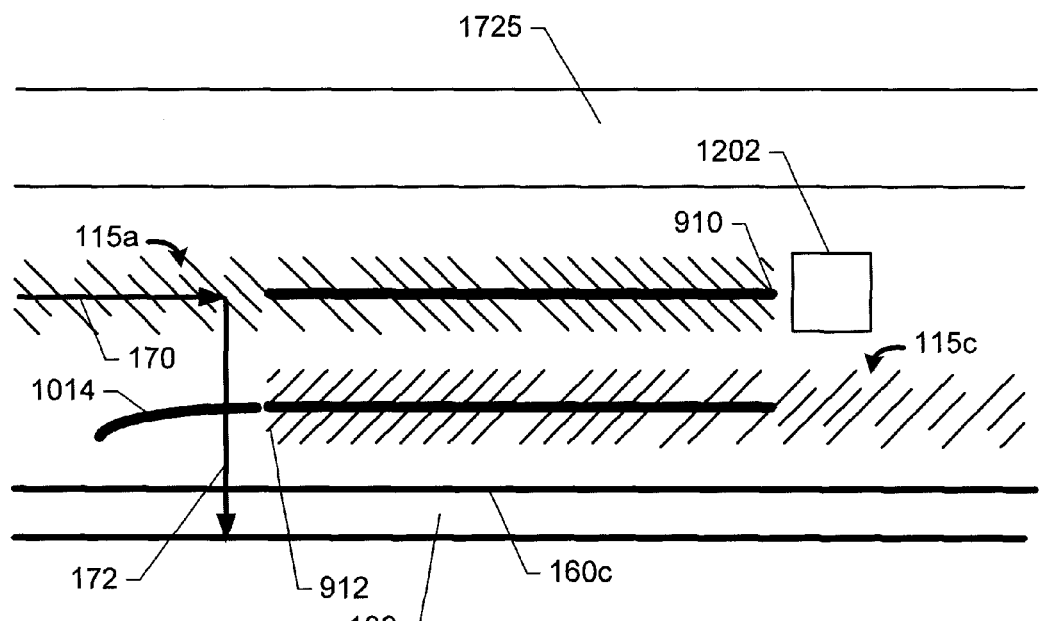

FIG. 12 shows an example of an acoustically absorptive layer that may act as a beam dump, configured in accordance with some embodiments. In some embodiments, one or more segmented reflective arrays may include an acoustically absorptive layer at the end of the segmented reflective arrays that is configured to absorb surface acoustic waves propagating past the end of the segmented reflective arrays. For example, segmented reflective array 115a may include acoustically absorptive layer 1202 disposed at the end of segmented reflective array 115a at 910. Acoustically absorptive layer 1202 may be configured to absorb and/or attenuate portions of surface acoustic wave 170 that may propagate past the end of segmented reflective array 115a at 910. As such, the absorbed acoustic energy may not reach a transducer.

In some embodiments, only one of two adjacent segmented reflective arrays may include the acoustically absorptive layer. For example, the acoustically absorptive layer should not absorb (or significantly interference, such as by scatterings, dampening, attenuation, etc.) rays propagating in scattered prevailing directions used for touch sensing, such as ray 172 shown in FIG. 12. As such, segmented reflective array 115c may not include an acoustically absorptive layer. However, other types of beam dumps that allow ray 172 to pass may be used. For example, segmented reflective array 115c may include solid core waveguide deflector 1014, or any other suitable beam dump. In other words, solid core waveguide deflector 1014 (as well as other types of beam dumps) disposed at the end of a segmented reflective array 115c may be configured allow surface acoustic waves scattered in the scattered prevailing direction from segmented reflective array 115a to pass.

FIG. 12 also shows that adjacent segmented reflective arrays may include different beam dump types. For example, segmented reflective array 115a includes acoustically absorptive layer 1202 while segmented reflective array 115c includes solid core waveguide deflector 1204.

Figure 13:
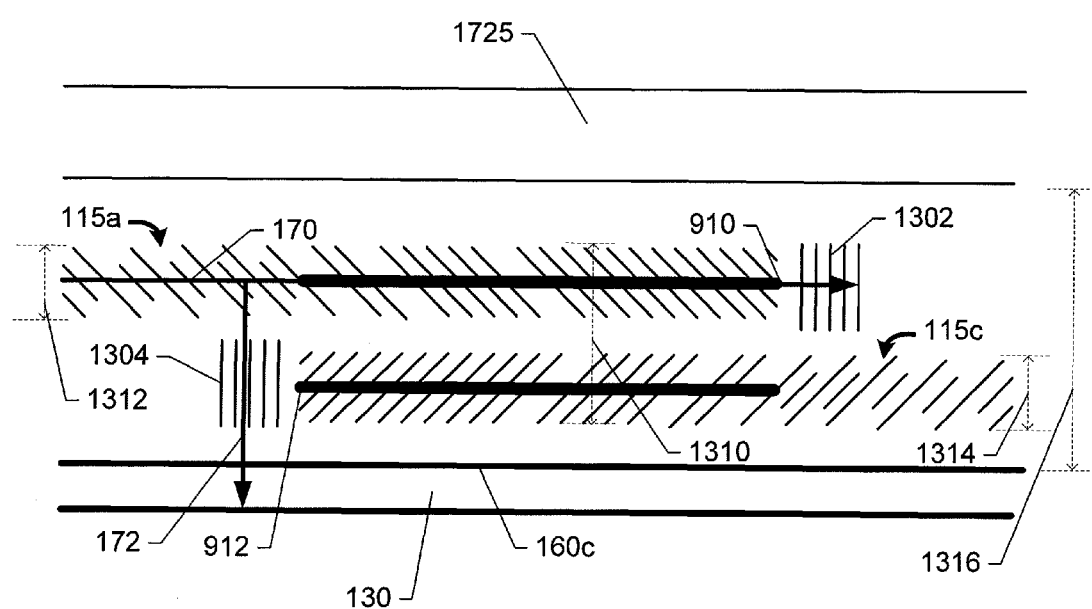

FIG. 13 shows an example of reflector gratings that may act as beam dumps, configured in accordance with some embodiments. In some embodiments, one or more segmented reflective arrays may include a reflector grating at the end of the segmented reflective arrays. For example, segmented reflective array 115a may include reflector grating 1302 disposed at the end of segmented reflective array 115a at 910. Additionally and/or alternatively, segmented reflective array 115c may include reflector grating 1304 disposed at the end of segmented reflective array 115c at 912.

In some embodiments, reflector grating 1302 (and 1304) may include one or more reflector elements that are disposed perpendicular to the prevailing direction of surface acoustic wave propagation. For example reflector grating 1302 includes reflector elements that are disposed perpendicular to the prevailing direction of surface acoustic wave 170 along segmented reflective array 115a. As such, portions of surface acoustic wave 170 that propagate past the end of segmented reflective array 115a at 910 may be dampened, reflected, and/or dissipated by reflector grating 1302. Furthermore, the reflector gratings may be configured to allow surface acoustic waves propagating in the scattered prevailing direction used for touch sensing to pass through. For example, ray 172 of surface acoustic wave 170 may pass through reflector grating 1304 without any significant interference (e.g., as may be caused by absorption, scattering, dampening, attenuation, etc.) because the orientation of the reflector elements of reflector grating 1304 is parallel with the scattered prevailing direction of ray 172.

While the reflector elements of reflector gratings 1302 and 1304 are shown in FIG. 13 to be perpendicular to the prevailing direction of surface acoustic wave propagation, this need not be the case in some embodiments. Any configuration in may be used in which ray 172 is not coherently scattered, and hence only weakly scattered by grating 1304, while rays in the prevailing direction of surface acoustic wave propagation (e.g. 174 of FIG. 9) are coherently scattered, and hence strongly scattered and blocked. Strong coherent scattering may require both the reflector angle and reflector spacing to be consistent with a scattering direction. There are many options for coherent reflector angle and reflector spacing scattering. For example 180° coherent backscattering may be achieved with half-wavelength spaced perpendicular reflectors. Alternatively, 90° scattering into the glass thickness direction and mode conversion to bulk waves may be achieved with full-wavelength spaced perpendicular reflectors. Yet another option is the use of non-perpendicular reflectors with appropriate spacing.

FIG. 14 shows an example of tapered segmented reflective arrays 1415a and 1415c, configured in accordance with some embodiments. The discussion herein regarding (non-tapered) segmented reflective arrays may be applicable to tapered segmented reflective arrays. For example, tapered segmented reflective arrays may include major reflective arrays, waveguide cores, and beam dumps. Furthermore, tapered segmented reflective arrays may be used in touch sensors similar to the non-tapered segmented reflective arrays (e.g., as discussed above with reference to FIGS. 2-3).

Adjacent tapered segmented reflective arrays may collectively define a collective adjacent width dimension that is not larger than the major the width dimension of the individual tapered segmented reflective arrays. For example, tapered segmented reflective array 1415a may define a major width dimension 1402 (e.g., at the beginning of tapered segmented reflective, array 1415a) and an adjacent width dimension 1404 (e.g., at the end of tapered segmented reflective array 1415a). Major width dimension 1402 may be wider (e.g., twice as large or greater) than adjacent width dimension 1404. Similarly, tapered segmented reflective array 1415c may define a major width dimension 1406 and an adjacent width dimension 1408, where major width dimension 1406 may be wider than adjacent width dimension 1408.

In some embodiments, adjacent tapered segmented reflective arrays 1415a and 1415c may be matched such that major width dimension 1402 is the same as major width dimension 1406 and adjacent width dimension 1404 is the same as adjacent width dimension 1408. Furthermore, adjacent width dimensions 1404 and 1408 may collectively define a collective adjacent width dimension 1410. As shown in FIG. 14, collective adjacent width dimension 1410 may be no wider than major width dimensions 1402 and 1406. For example, collective adjacent width dimension 1410 may be substantially the same width as major width dimensions 1402 and 1406.

Tapered segmented reflective arrays may be utilized to provide even narrower border widths and/or larger touch sensitive regions than non-tapered segmented reflective arrays. As shown in FIG. 13, non-tapered segmented reflective arrays may define a collective adjacent width dimension 1310 that is wider than major width dimensions 1312 and 1314 of non-tapered segmented reflective arrays 115a and 115c, respectively. Accordingly, border region width 1316-must be sufficiently wide not only to accommodate collective adjacent width dimension 1310, but also for beam widths of surface acoustic waves propagating in the overlap region. In that sense, border region width 1445 (as shown in FIG. 14) may be made smaller than border region width 1316 with the use of tapered segmented reflective arrays.

FIG. 15 shows a partial magnified view of tapered reflective array 1415c, configured in accordance with some embodiments. FIG. 15, like the other Figures, is not necessarily drawn to scale to more clearly illustrate the inventive concepts. For example, the width of tapered reflective array 1415c is exaggerated relative to the length in FIG. 15.

As shown, tapered reflective array 1415c may include major reflective array 1502 and waveguide core 1504. The beginning of major reflective array 1502 may define non-adjacent portion 1508 having major width dimension 1406. The end of major reflective array 1502 may define adjacent portion 1510 having adjacent width dimension 1408, which may be less than or equal to half of major width dimension 1406 in some embodiments. For example, major width dimension 1406 may be 4 mm and adjacent width 1408 may be 2 mm, in accordance with some example embodiments.

Major reflective array 1502 may further define transition portion 1512 between adjacent portion 1510 and non-adjacent portion 1508. In transition portion 1512, major reflective array 1502 (e.g., via the major reflector elements) may further define transition width dimension 1414 that tapers from major width dimension 1406 to adjacent portion width dimension 1408 along prevailing direction 1506.

In some embodiments, waveguide core 1504 may include a waveguide reflective array and a solid core waveguide. In that sense a tapered segmented reflective array, like a non-tapered segmented reflective array, may include different waveguide core types. As shown in FIG. 15, waveguide core 1504 may include solid core waveguide 1514 in adjacent portion 1510 and transition portion 1512. As such, the major reflector elements of major reflective array 1502 may have center-to-center spacings that leave little or no room for waveguide reflector elements (e.g., where n=1 in Equation 3) in adjacent portion 1510 and transition portion 1512.

In non-adjacent portion 1508, waveguide core 1504 may include waveguide reflective array 1516. As such, the major reflector elements of major reflective array 1502 may have center-to-center spacings that leave room for waveguide reflector elements (e.g., where n=2 or more in Equation 3) in non-adjacent portion 1508. Waveguide reflective array 1516 may define waveguide width dimension 1518 that is smaller than major waveguide width dimension 1406. For example, waveguide width dimension 1518 may be 0.6 mm while major width dimension 1406 may be 4 mm.

In some embodiments, solid core waveguide 1514 may define waveguide width dimension 1520 in adjacent portion 1510. In adjacent portion 1510, the beam widths of surface acoustic waves may be kept narrow to keep surface acoustic waves within tapered segmented reflective array 1415c and away from adjacent segmented reflective array 1415a (as shown in FIG. 14). As such, waveguide width dimension 1520 may be larger than waveguide width dimension 1518. For example, waveguide width dimension 1520 may be 1 mm while waveguide width dimension 1518 may be 0.6 mm. In transition portion 1512, solid core waveguide 1514 may define waveguide width dimension 1522 that increases in prevailing direction 1506 from waveguide width dimension 1518 to waveguide width dimension 1520.

In some embodiments, waveguide core 1504 may be configured to guide surface acoustic waves such that they their propagation path follows the middle (or substantially the middle, such as the middle third) of major reflective array 1502. For example, waveguide core 1504 (including solid core waveguide 1514 and waveguide reflective array 1516) may define waveguide centerline 1524. Solid core waveguide 1514 may be positioned relative to major reflective array 1502 such that waveguide centerline 1524 is kept at the middle (and/or within the middle third) of transition width dimension 1414 at transition portion 1512 and/or major width dimension 1408 at adjacent portion 1510. Additionally and/or alternatively, waveguide reflective array 1516 may be positioned relative to major reflective array 1502 such that waveguide centerline 1524 is at the middle (and/or within the middle third) of major width dimension 1406 at non-adjacent portion 1508. In that sense, waveguide core 1504 (including reflective array 1516 and solid core waveguide 1514) may define an "S curve" in adjacent portion 1510, transition portion 1512 and non-adjacent portion 1508 that surface acoustic waves may follow and be redirected at least two times (e.g., as shown in FIG. 16a for surface acoustic wave 1602).

FIGS. 16a and 16b show partial magnified views of tapered reflective array 1415c including an example travel path for surface acoustic wave 1602, in accordance with some embodiments. As shown in FIG. 16a, waveguide core 1504 may be configured to guide surface acoustic wave 1602 along the middle of transition width dimension 1414 in accordance with the tapering of transition width dimension 1414 in transition portion 1512. As such, surface acoustic wave 1602 may propagate in a direction that follows waveguide centerline 1524 (as shown in FIG. 16b) that is offset by angle 1605 from prevailing direction 1506 in transition portion 1512.

As surface acoustic wave 1602 propagates along tapered reflective array 1415c, its major reflector elements may be disposed to scatter portions of surface acoustic wave 1602 in a scattered prevailing direction shown by rays 1604, 1606, and 1608. FIG. 16*b* shows a partial magnified view of tapered reflective array 1415*c* (with waveguide core 1504 omitted to better illustrate the major reflector elements), in accordance with some embodiments. At transition portion 1512, major reflector element 1603 may be disposed with a reflector angle that may cause ray 1606 to be scattered at an angle Φa relative to the prevailing direction of surface acoustic wave 1602. As such, the reflector angle of major reflector element 1603 with respect to waveguide centerline 1524 may be given by Φa/2. In some embodiments, it may be preferable not only to modify reflector angles but also to adjust reflector spacing to provide for coherent scattering in the desired direction, as discussed in U.S. patent application Ser. No. 13/688,149, incorporated by reference above.

Similarly, at adjacent portion 1510, major reflector element 1607 may be disposed with a reflector angle that may cause ray 1608 to be scattered at an angle Φb relative to the prevailing direction of surface acoustic wave 1602. As such, the reflector angle of major reflector element 1607 with respect to waveguide centerline 1524 may be given by Φb/2. A similar configuration may be applicable to major reflector elements at non-adjacent portion 1508, where the ray reflector angle of major reflector elements with respect to waveguide centerline 1524 may also be given by Φb/2. In non-adjacent portion 1508 and/or adjacent portion 1510, Φa and Φb may differ by angle 1605 (as shown in FIG. 16*a*). For example, Φb may be 90°, angle 1605 may be 1°, and Φa may be 89° (e.g., Φa=Φb−angle 1605). In that sense, some embodiments of major reflective array 1502 may include a first major reflector element at the transition portion disposed at a first reflector angle that is different from a second reflector angle of a second major reflector element disposed at the non-adjacent portion or the adjacent portion.

FIG. 20 shows an example of tapered segmented reflective arrays 2015*a* and 2015*c*, configured in accordance with some embodiments. Segmented reflective array 2015*a* may include acoustically absorptive layer 2002 disposed at the end of segmented reflective array 2015*a*. Segmented reflective array 2015*c* may include reflector grating 2004 disposed at the end of segmented reflective array 2015*c*. As discussed above, any type of suitable beam dump may be disposed at the end of segmented reflective arrays 2015*a* and 2015*c*. However, as shown in FIG. 20, segmented reflective arrays 2015*a* and 2015*c* do not include waveguide cores (e.g., waveguide cores 904 and 908 shown in FIG. 9). Compared to embodiments of segmented reflective arrays with waveguide cores, the embodiment shown in FIG. 20 may be less demanding on the transfer of energy between transducers and reflective arrays because emitted surface acoustic waves from transducers may couple to a plurality of waveguide modes. For some applications, this may be advantageous even at the cost of using wider reflective arrays than are possible with the use of waveguide cores.

FIG. 17*a* shows a simplified cross-sectional view of an example touch sensor device 1700, which may be an interactive digital signage device, a touch monitor, a touch computer, a touch video display, a touch mobile device, and/or any other suitable machine having touch-input functionality. Touch device 1700 may include substrate 105, acoustically benign layer 1705, transducers 110, reflective arrays 115, display device 1710, touch controller 1715 and housing 1720, among other things.

Display device 1710 may be, for example, a liquid crystal display (LCD), organic light emitting device (OLED) display, electrophoretic display (EPD), vacuum fluorescent, cathode ray tube, and/or any other display component. In some embodiments, display device 1710 may provide a graphical user interface compatible with touch inputs. Display device 1710 may be positioned such that it is visible through substrate 105, thereby enabling a person viewing front surface 120 of substrate 105 to see display device 1710 through substrate 105.

In some embodiments, back surface 125 of substrate 105 may be mechanically bonded to display device 1710 via acoustically absorptive bonding layer 1725. Layer 1725 may be disposed along the edges of display device 1710. In addition to its mechanical bonding function, layer 1725 may be configured to prevent surface acoustic waves from improperly propagating across back surface 125, which may lead to interference at transducers 115. In other words, layer 1725 may act as a boundary in which surface acoustic waves propagating in border regions 145 (e.g., as shown in FIG. 2*b*) at back surface 125 are strongly attenuated. In some embodiments, it may be desirable to concentrate acoustic wave energy propagating along reflective arrays away from layer 1725. As shown in FIGS. 7*a* and 7*b*, waveguide centerline 770-*of* waveguide reflective array 720 may be disposed away from the center of major width dimension 740 to concentrate acoustic energy of surface acoustic wave 505 away from layer 1725.

Alternatively or additionally, back surface 125 of substrate 105 may be mechanically bonded to housing 1720 via an acoustically absorptive bonding layer (not shown). The layer may also be configured to prevent surface acoustic waves from improperly propagating across back surface 125, which may lead to interference at receiving transducers 115. As such, a waveguide centerline of a waveguide reflective array may be disposed away from the center of a major width dimension to concentrate acoustic energy of a surface acoustic wave away from the layer bonding substrate 105 to housing 1720.

FIG. 17*b* shows another simplified cross-sectional view of an example touch sensor device 1700, configured in accordance with some embodiments. As shown, substrate 105 is mechanically bonded to display device 1710 via absorptive bonding layer 1725 and acoustically benign layer 1705. Acoustically benign layer 1705, on which transducer 110 and reflective array 115 are disposed, hide from view not only transducer 110 and reflective array 115 but also absorptive bonding layer 1725. In some embodiments, layer 1705 does not need to be acoustically benign where it is in contact with layer 1725. However, a common acoustically benign layer 1705 that hides transducer 110, reflective array 115 and absorptive bonding layer 1725 may provide manufacturing economy and cosmetic uniformity, in accordance with some embodiments.

Returning to FIG. 17*a*, touch controller 1715 may be configured to control transducers 110 and to determine touch coordinates. The structure and operation of touch controller 1715 is discussed further below with respect to FIGS. 18 and 19.

Housing 1720 may contain and protect display device 1710, layer 1705, transducers 110, reflective arrays 115, touch controller 1715, as well as other components of the device that are not shown to avoid unnecessarily overcomplicating the drawings. In some embodiments, one or more of the components of touch device 1700 may be attached via housing 1720.

FIG. 18 shows a block diagram of an example control system 1800 for a touch sensor device, configured in accordance with some embodiments. Control system 1800 may include touch controller 1715, main controller 1805, transducers 110 and display device 1710.

Touch controller 1715 may include one or more processors 1715a configured to execute firmware or software programs stored in one or more memory devices 1715b to perform the functionality described herein. Touch controller 1715 may be coupled via wires, leads, and/or by any other suitable manner to transducers 110 to control the transmission and reception of surface acoustic waves, such as those discussed above.

Touch controller 1715 may further be configured to determine touch coordinates on the touch region based on the timing of an attenuation received at a receiving transducer, such as receiving transducers 110b, 110d, 110f and 110h discussed above.

In some embodiments, touch controller 1715 may interface with a computer system, such as a personal computer, embedded system, kiosk, user terminal, and/or other machine as a human-to-machine interface device. The computer system may include main controller 1805 with one or more processors 1805a configured to execute firmware or software programs stored in one or more memory devices 1805b. Via the execution of the programs, main controller 1805 may generate a visual component (and/or display element) that is sent to display device 1710 for display. The visual component may include or comprise a user interface that is operable using the touch sensor.

The computing system may further include other display devices, audio input and/or output capability, keyboard, electronic camera, other pointing input device, or the like (not shown). The computer system may operate using custom software, but more typically may use a standard and/or other type of operating system. In examples where the computing system is configured to enable use of other user input devices, the touch sensor may be employed as a primary or secondary input device.

Main controller 1805 may be communicatively connected with touch controller 1715. In some embodiments, touch coordinates and/or position information may be sent from touch controller 1715 to main controller 1805, allowing a user to interact with a program executing on main controller 1805 via the touch sensor. In some embodiments, touch controller 1715 may be further configured to map the touch coordinates to appropriate control actions that are sent to main controller 1805. For example, a multi-dimensional dataset (such as a two dimensional table) may be used to associate timing information of a surface acoustic wave attenuation with one or more coordinates representing a physical location of the sensor. In some embodiments, touch controller 1715 may transmit (x,y) touch coordinates to main controller 1805.

While FIG. 18 shows touch controller 1715 as a separate device from main controller 1805, a single controller may be configured to perform all of the functions described herein. For example, touch controller 1715 and main controller 1805 may be integrated in an embedded system in some embodiments.

In some embodiments, each processing/controlling component (e.g., processor 1715a and/or processor 1805a) of control system 800 may be embodied as, for example, circuitry or other type of hardware elements (e.g., a suitably programmed processor, combinational logic circuit, and/or the like). The processing/controlling components may be configured by a computer program product comprising computer-readable program instructions stored on a non-transitory computer-readable medium (e.g., memory 1715b and/or memory 1805b) that is executable by a suitably configured processing device (e.g., processor 1715a and/or processor 1805a), or some combination thereof.

Processor 1715 and/or processor 1805a may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 18 as single processors, processor 1715a and/or processor 1805a may comprise a plurality of processors in some embodiments. The plurality of processors may be embodied on a single computing device or may be distributed across a plurality of computing devices collectively configured to function as a processing module of control system 1800. The plurality of processors may be in operative communication with each other and may be collectively configured to perform one or more functionalities of control system 1800 as described herein.

Whether configured by hardware, firmware/software methods, or by a combination thereof, processor 1715a and/or processor 1805a may comprise an entity capable of performing operations according to various embodiments while configured accordingly. Thus, for example, when processor 1715a and/or processor 1805a are embodied as an ASIC, FPGA or the like, processor 1715a and/or processor 1805a may comprise specifically configured hardware for conducting one or more operations described herein. Alternatively, as another example, when processor 1715a and/or processor 1805a are embodied as an executor of instructions, such as may be stored in memory 1715b and/or memory 1805b, the instructions may specifically configure processor 1715a and/or processor 1805a to perform one or more algorithms and operations described herein.

Memory 1715b and/or memory 1805b may comprise, for example, volatile memory, non-volatile memory, or some combination thereof. Although illustrated in FIG. 18 as single memory components, memory 1715b and/or memory 1805b may comprise a plurality of memory components. The plurality of memory components may be embodied on a single computing device or distributed across a plurality of computing devices. In various embodiments, memory 1715b and/or memory 1805b may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 1715b and/or memory 1805b may be configured to store information, data, applications, instructions, or the like for enabling control system 1800 to carry out various functions in accordance with some embodiments. For example, in at least some embodiments, memory 1715b and/or memory 1805b may be configured to buffer input data for processing by processor 1715a and/or processor 1805a. Additionally or alternatively, in at least some embodiments, memory 1715b and/or memory 1805b may be configured to store program instructions for execution by processor 1715a and/or processor 1805a. Memory 1715b and/or memory 1805b may store information in the form of static and/or dynamic information. This stored information may be stored and/or used by control system 1800 during the course of performing its functionalities.

Embodiments have been described above with reference to a block diagram of circuitry. Below is a discussion of an example process flowchart describing functionality that may be implemented by one or more components of circuitry, such as those discussed above in connection with control system 1800 in combination with touch sensor 100. Each block of the circuit diagrams and process flowchart, and combinations of blocks in the circuit diagrams and process flowchart, respectively, may be implemented by various means including computer program instructions. These computer program instructions may be loaded onto a general purpose computer, special purpose computer, or other programmable data processing apparatus, such as processor 1715a or processor 1805a discussed above with reference to FIG. 18, to produce a machine, such that the computer program product includes the instructions which execute on the computer or other programmable data processing apparatus create a means for implementing the functions specified in the flowchart block or blocks.

These computer program instructions may also be stored in a computer-readable storage device (e.g., memory 1715b and/or memory 1805b) that may direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, may be implemented by special purpose hardware-based computer systems that perform the specified functions or steps, or combinations of special purpose hardware and computer instructions.

FIG. 19 shows an example of a method 1900 for determining a coordinate of a touch event on a sensor, performed in accordance with some embodiments. The coordinate of the touch even may at least partially represent a physical location on the sensor where the touch event occurred. For instance, the coordinate of the touch event may be along a sensing axis, such as the X-axis or Y-axis. Thus the coordinate of touch may determine a physical location on the sensor along the X-axis or the Y-axis.

In some embodiments, method 1900 may be performed by, for example, the structures shown in FIGS. 1-3, 5a-d, 7a, 8a-b, and 9-17. For instance, circuitry such as touch controller 1715 or main controller 1805 may be configured to perform method 1900. For clarity, method 1900 may be described with reference to elements shown in these figures. It will be appreciated, however, that other structures may be used to perform method 1900 in other embodiments.

Method 1900 may start at 1905 and proceed to 1910, where circuitry may generate an electrical excitation signal. For example, circuitry such as touch controller 1715 or main controller 1805 may be configured to generate the excitation signal. In some embodiments, the excitation signal may be a sinusoidal wave or a pseudo sinusoidal wave tone burst at a desired frequency.

At 1915, the circuitry may transmit the electrical excitation signal to a transmitting transducer that is configured to transform the electrical excitation signal into at least one acoustic wave. As discussed above, the transmitting transducer (such as transmitting transducers 110a, 110c, 110e and 110g) may include electrodes connected with the circuitry, a piezoelectric element, and a coupling block in some embodiments. The electrical excitation signal may be applied by the circuitry to the electrodes to cause a piezoelectric element in the transmitting transducer to vibrate. Vibration of the piezoelectric element may generate bulk waves in the coupling block which in turn couple to the substrate as surface acoustic waves.

At 1920, the circuitry may receive an electrical return signal from a receiving transducer that is configured to transform the acoustic wave into the electrical return signal. Also as discussed above, the receiving transducer (such as receiving transducers 110b, 110d, 110f and 110h) may include electrodes connected with the circuitry, a piezoelectric element, and a coupling block in some embodiments. Acoustic waves coupled to the substrate may cause vibrations in the piezoelectric element via the coupling block, which in turn causes an oscillation voltage to appear on the electrodes. The circuitry may receive the electrical return signal via the electrodes.

The electrical return signal may represent the acoustic wave subsequent to its propagation through the sensor. Thus, an attenuation in the acoustic wave, as may be caused by a touch event that occurred while the acoustic wave propagated through the sensor, may cause a corresponding attenuation in the electrical returned signal. FIGS. 3a and 3b show an example of multi-ray propagation paths of an acoustic wave through an example sensor. This discussion of FIG. 3a or FIG. 3b may occur subsequent to 1915 and prior to 1920 of FIG. 19.

At 1925, the circuitry may process the electrical return signal received at 1920. Processing the electric return signal may be performed to determine a coordinate of a touch event on the sensor in touch sensitive region 205. As discussed above, the coordinate may at least partially represent (i.e., along one sensing axis) a physical location on the sensor where the attenuation occurred. Method 1900 may then end at 1930. Details techniques for determining touch coordinates based on the electrical return signal are discussed in greater detail in U.S. patent application Ser. No. 13/688,149 and U.S. patent application Ser. No. 13/682,621, both incorporated by reference above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An acoustic touch apparatus, comprising:
a substrate configured to propagate surface acoustic waves, the substrate having:
a first segmented reflective array, comprising:
a first major reflective array configured to propagate a first portion of surface acoustic waves in a first direction defining a first beginning and a first end of the first major reflective array; and
a first waveguide core configured to concentrate acoustic energy of the first portion of surface acoustic waves;
a second segmented reflective array, comprising:
a second major reflective array configured to propagate a second portion of surface acoustic waves in a second direction defining a second beginning and a second end of the second major reflective array; and a second waveguide core configured to concentrate acoustic energy of the second portion of surface acoustic waves, wherein:

the first end of the first major reflective array extends beyond the second end of the second major reflective array, thereby defining a first directly adjacent portion of the first major reflective array;

the second end of the second major reflective array extends beyond the first end of the first major reflective array, thereby defining a second directly adjacent portion of the second major reflective array;

the first directly adjacent portion and the second directly adjacent portion define an overlap region of the substrate; and the first direction is antiparallel to the second direction.

2. The acoustic touch apparatus of claim 1, wherein:
the first directly adjacent portion includes the first waveguide core; and
the second directly adjacent portion includes the second waveguide core.

3. The acoustic touch apparatus of claim 1 further comprising a beam dump disposed at the first end of the first major reflective array configured to decrease intensity of surface acoustic wave propagation in the first direction past the first end of the first major reflective array.

4. The acoustic touch apparatus of claim 3, wherein the beam dump comprises a solid waveguide core deflector configured to redirect surface acoustic waves away from a transducer.

5. The acoustic touch apparatus of claim 3, wherein the beam dump comprises a reflector grating configured to dampen surface acoustic waves propagating in the first direction.

6. The acoustic touch apparatus of claim 3, wherein the beam dump comprises an acoustically absorptive layer.

7. The acoustic touch apparatus of claim 1, wherein the first waveguide core is defined at least partially by a solid core waveguide in the first directly adjacent portion.

8. The acoustic touch apparatus of claim 7, wherein the first waveguide core is defined at least partially by waveguide reflector elements.

9. The acoustic touch apparatus of claim 1, wherein:
the first major reflective array defines a first non-adjacent portion of the first major reflective array having a major width dimension;
the first directly adjacent portion defines an adjacent width dimension smaller than the major width dimension; and
the first major reflective array defines a first transition portion between the first non-adjacent portion and the first directly adjacent portion having a transition width dimension that tapers from the major width dimension to the adjacent width dimension in the first direction along the first major reflective array.

10. The acoustic touch apparatus of claim 9, wherein the first waveguide core comprises a solid core waveguide in the first transition portion and the first directly adjacent portion.

11. The acoustic touch apparatus of claim 10, wherein:
the solid core waveguide defines a first waveguide width dimension in the first directly adjacent portion and a second waveguide width dimension in the first transition portion; and the first waveguide width dimension is larger than the second waveguide width dimension.

12. The acoustic touch apparatus of claim 11, wherein the second waveguide width dimension increases in the first direction within the first transition portion.

13. The acoustic touch apparatus of claim 10, wherein:
the solid core waveguide defines a waveguide centerline; and
the solid core waveguide is positioned relative to the first major reflective array such that the waveguide centerline is within a center third of the transition width dimension.

14. The acoustic touch apparatus of claim 9, wherein:
the first major reflective array includes reflector elements each having a reflector angle; and
a reflector angle of a first reflector element in the first transition portion is different from a reflector angle of a second reflector element in the first directly adjacent portion.

15. The acoustic touch apparatus of claim 9, wherein:
the second major reflective array defines a second non-adjacent portion of the second major reflective array having the major width dimension;
the second directly adjacent portion defines the adjacent width dimension; and
the second major reflective array defines a second transition portion between the second non-adjacent portion and the second directly adjacent portion having a second transition width dimension that tapers from the major width dimension to the adjacent width dimension in the second direction along the second major reflective array.

16. The acoustic touch apparatus of claim 15, wherein the first directly adjacent portion and the second directly adjacent portion collectively define a collective adjacent width dimension that is the same as or smaller than the major width dimension.

17. An acoustic touch apparatus, comprising:
a substrate configured to propagate surface acoustic waves, the substrate having:
at least eight acoustic wave transducers; and
at least eight segmented reflective arrays, each segmented reflective array including:
a major reflective array configured to propagate surface acoustic waves, and
a waveguide core configured to concentrate acoustic energy of the surface acoustic waves; and
wherein one end of each major reflective array extends beyond an end of another major reflective array, thereby defining a directly adjacent portion of overlap between two major reflective arrays, and direction of propagation of the surface acoustic waves is antiparallel between the two major reflective arrays having the directly adjacent portion of overlap.

18. An acoustic touch apparatus, comprising:
a substrate configured to propagate surface acoustic waves, the substrate having:
at least six acoustic wave transducers; and
at least six reflective arrays, wherein at least four of the at least six reflective arrays are segmented reflective arrays that each includes:
a major reflective array configured to propagate surface acoustic waves, and
a waveguide core configured to concentrate acoustic energy of the surface acoustic waves; and
wherein one end of each major reflective array extends beyond an end of another major reflective array, thereby defining a directly adjacent portion of overlap between two major reflective arrays, and direction of propagation of the surface acoustic waves is antiparallel between the two major reflective arrays having the directly adjacent portion of overlap.

* * * * *